(12) United States Patent
Ruyle et al.

(10) Patent No.: US 11,618,850 B2
(45) Date of Patent: Apr. 4, 2023

(54) FRACTURING METHOD USING LOW-VISCOSITY FLUID WITH LOW PROPPANT SETTLING RATE

(71) Applicant: Weatherford Technology Holdings, LLC, Houston, TX (US)

(72) Inventors: Branden Ruyle, Houston, TX (US); Jian Huang, Houston, TX (US); Clayton Smith, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/628,234

(22) PCT Filed: Jul. 23, 2018

(86) PCT No.: PCT/US2018/043295
§ 371 (c)(1),
(2) Date: Jan. 2, 2020

(87) PCT Pub. No.: WO2019/027710
PCT Pub. Date: Feb. 7, 2019

(65) Prior Publication Data
US 2020/0123436 A1    Apr. 23, 2020

Related U.S. Application Data

(63) Continuation of application No. 15/666,327, filed on Aug. 1, 2017, now abandoned.

(51) Int. Cl.
*E21B 43/267* (2006.01)
*C09K 8/68* (2006.01)
(Continued)

(52) U.S. Cl.
CPC ................ *C09K 8/68* (2013.01); *C09K 8/685* (2013.01); *C09K 8/80* (2013.01); *C09K 8/882* (2013.01);
(Continued)

(58) Field of Classification Search
None
See application file for complete search history.

(56) References Cited

U.S. PATENT DOCUMENTS 2,798,053 A    7/1957  Brown
3,058,909 A   10/1962  Kern
(Continued)

FOREIGN PATENT DOCUMENTS

| WO | 2015-042028 A1 | 3/2015 |
| WO | 2015-125121 A1 | 8/2015 |
| WO | 2016-079625 A1 | 5/2016 |

OTHER PUBLICATIONS

International Search Report based on copending PCT Application No. PCT/US18/43295 dated Nov. 20, 2018, 12 pages.
(Continued)

*Primary Examiner* — Andrew Sue-Ako
(74) *Attorney, Agent, or Firm* — Cabello Hall Zinda, PLLC

(57) ABSTRACT

A fluid design with enhanced proppant-carrying capacity utilizes a low-viscosity fluid with high proppant carrying capacity and low required power for injection into a hydrocarbon-bearing, subterranean formation. A preferred viscosifying agent that comprises a copolymer polymerized from an acrylic acid monomer and a monomer selected from: a) at least one carboxylic acid monomer; b) at least one $C_1$ to $C_5$ alkyl ester and/or at least one $C_1$ to $C_5$ hydroxyalkyl ester of acrylic acid or methacrylic acid; c) one crosslinking monomer; and optionally d) at least one $\alpha,\beta$-ethylenically (Continued)

unsaturated monomer, may be used to produce a fracturing fluid that has the pumpability of a slick water fluid and the proppant-carrying ability of a cross-linked gel. An optimization process to optimize hydraulic fracture design evaluates and quantifies the proppant-carrying capacity of the invented fluid and its impact in the proppant transport during fracturing.

19 Claims, 16 Drawing Sheets

(51) Int. Cl.
    *C09K 8/80*     (2006.01)
    *C09K 8/88*     (2006.01)
    *E21B 43/26*     (2006.01)
    *E21B 43/25*     (2006.01)

(52) U.S. Cl.
    CPC .............. *C09K 8/887* (2013.01); *E21B 43/26* (2013.01); *E21B 43/267* (2013.01); *C09K 2208/26* (2013.01); *E21B 43/25* (2013.01)

(56) References Cited

U.S. PATENT DOCUMENTS

| | | | |
|---|---|---|---|
| 3,163,219 | A | 12/1964 | Wyant et al. |
| 7,271,133 | B2 | 9/2007 | Weaver et al. |
| 7,708,069 | B2 | 5/2010 | Watters et al. |
| 8,114,818 | B2 | 2/2012 | Reddy et al. |
| 8,501,983 | B2 | 8/2013 | Yang et al. |
| 8,950,493 | B2 | 2/2015 | van Petegem et al. |
| 9,085,975 | B2 | 7/2015 | Abad |
| 9,328,285 | B2 | 5/2016 | Ekstrand et al. |
| 9,410,399 | B2 | 8/2016 | Andersen |
| 2002/0065359 | A1* | 5/2002 | Allan .............. C08K 3/22 524/556 |
| 2006/0283591 | A1* | 12/2006 | Willberg .............. C09K 8/68 507/248 |
| 2008/0093073 | A1* | 4/2008 | Bustos .............. C09K 8/80 166/279 |
| 2011/0223125 | A1* | 9/2011 | Hough .............. A61K 8/86 424/70.12 |
| 2011/0272159 | A1* | 11/2011 | Osiptsov .............. C09K 8/62 166/308.1 |
| 2012/0273206 | A1* | 11/2012 | Zamora .............. C09K 8/68 166/308.1 |
| 2013/0189198 | A1 | 7/2013 | Tamareselvy |
| 2014/0014348 | A1 | 1/2014 | Mahoney et al. |
| 2014/0178325 | A1* | 6/2014 | Martinez-Castro .... C09D 5/024 424/70.16 |
| 2014/0251610 | A1* | 9/2014 | Brannon .............. C09K 8/68 166/280.1 |
| 2014/0365409 | A1 | 12/2014 | Burch et al. |
| 2015/0252250 | A1 | 9/2015 | Levey et al. |
| 2017/0029692 | A1 | 2/2017 | Dugonjic-Bilic et al. |
| 2018/0346802 | A1 | 12/2018 | Noles, Jr. et al. |
| 2019/0040305 | A1 | 2/2019 | Ruyle et al. |
| 2019/0119563 | A1* | 4/2019 | He ............ C09K 8/80 |

OTHER PUBLICATIONS

Restriction Requirement in U.S. Appl. No. 15/666,327, dated May 14, 2018, 7-pgs.
Office Action in U.S. Appl. No. 15/666,327, dated Oct. 16, 2018, 11-pgs.
Office Action issued in co-pending Russian Application No. 2020108457, dated Sep. 30, 2020, 14 pages.
Opposition in counterpart Chilean Appl. 202000264, written date May 25, 2021, 9-pgs.

\* cited by examiner

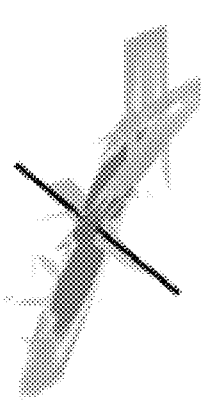
FIG. 6A''  FIG. 6B''  FIG. 6C''
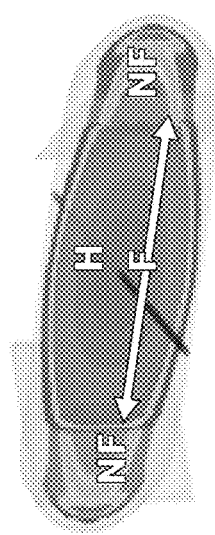
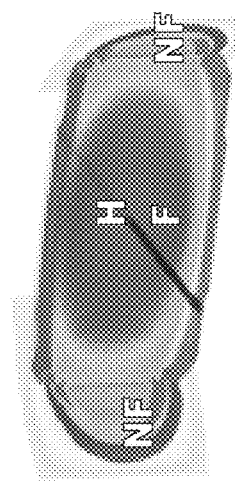
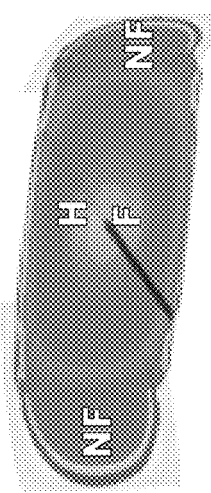
FIG. 6A'  FIG. 6B'  FIG. 6C'
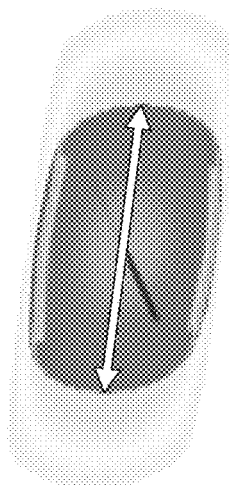
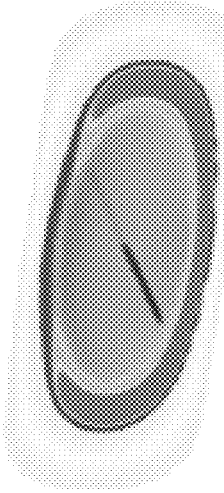
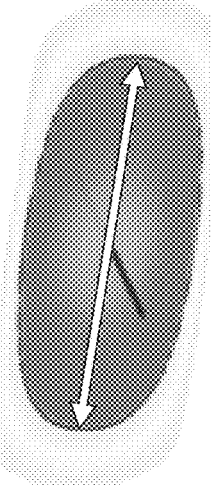
FIG. 6A  FIG. 6B  FIG. 6C

FRACTURING METHOD USING LOW-VISCOSITY FLUID WITH LOW PROPPANT SETTLING RATE

CROSS-REFERENCE TO RELATED APPLICATIONS

This is a 371 application of International Appl. PCT/US2018/043295 filed 23 Jul. 2018, which is a continuation of U.S. application Ser. No. 15/666,327 filed 1 Aug. 2017.

FEDERALLY SPONSORED RESEARCH OR DEVELOPMENT

Not Applicable

BACKGROUND OF THE INVENTION

1. Field of the Invention

The present invention generally relates to methods and compositions for hydraulically fracturing subterranean formations. More particularly, it relates to a system for Fracturing that uses fluids capable of suspending proppant materials without requiring high pumping power.

2. Description of the Related Art Including Information Disclosed Under 37 CFR 1.97 and 1.98

Fracturing Fluids and Additives

Fracturing fluids are pumped into the well to create conductive fractures and bypass near-wellbore damage in hydrocarbon-bearing zones. The net result is an expansion in the productive surface-area of the reservoir, compared to the un-fractured formation. A series of chemical additives are selected to impart a predictable set of properties of the fluid, including viscosity, friction, formation-compatibility, and fluid-loss control.

To create the fracture, a fluid is pumped into the wellbore at a high rate to increase the pressure in the wellbore at the perforations to a value greater than the breakdown pressure of the formation. The breakdown pressure is generally believed to be the sum of the in-situ stress and the tensile strength of the rock. Once the formation is broken down and the fracture created, the fracture can be extended at a pressure called the fracture-propagation pressure. The fracture-propagation pressure is equal to the sum of:

The in-situ stress
The net pressure drop
The near-wellbore pressure drop

The net pressure drop is equal to the pressure drop down the fracture as the result of viscous fluid flow in the fracture, plus any pressure increase caused by tip effects. The near-wellbore pressure drop can be a combination of the pressure drop of the viscous fluid flowing through the perforations and/or the pressure drop resulting from tortuosity between the wellbore and the propagating fracture. Thus, the fracturing-fluid properties are very important in the creation and propagation of the fracture.

The ideal fracturing fluid should:
Be able to transport the propping agent in the fracture
Be compatible with the formation rock and fluid
Generate enough pressure drop along the fracture to create a wide fracture
Minimize frictional pressure losses during injection
Be formulated using chemical additives that are approved by the local environmental regulations.
Exhibit controlled-break to a low-viscosity fluid for cleanup after the treatment
Be cost-effective.

The viscosity of the fracturing fluid is an important point of differentiation in both the execution and in the expected fracture geometry. Many current practices, generally referred to as "slick water" treatments, use low-viscosity fluids pumped at high rates to generate elongated, well contained or complex fractures with low-concentrations of propping agent (0.2-5 lbm proppant added (PPA) per gallon). In order to minimize risk of early settling, pumping rates must be sufficiently high to transport proppant over long distances (often along horizontal wellbores) before entering the fracture. By comparison, for conventional wide-biwing fractures the carrier fluid must be sufficiently viscous (normally 50 to 1000 cp at nominal shear rates from 40-100 $sec^{-1}$) to transport higher proppant concentrations (1-10 PPA per gallon). These treatments are often pumped at lower pump rates and may create wider fractures (normally 0.2 to 1.0 in.) with abnormal height growth and containment.

The density of the carrier-fluid is also important. The fluid density affects the surface injection pressure and the ability of the fluid to flow back after the treatment. Water-based fluids generally have densities near 8.4 ppg. Oil-base fluid densities will be 70 to 80% of the densities of water-based fluids. Foam-fluid densities can be substantially less than those of water-based fluids. In low-pressure reservoirs, low-density fluids, like foam, can be used to assist in the fluid cleanup. Conversely, in certain deep reservoirs (including offshore frac-pack applications), there is a need for higher density fracturing fluids whose densities can span up to >12 ppg.

A fundamental principle used in all fracture models is that "the fracture volume is equal to the total volume of fluid injected minus the volume of fluid that leaks off into the reservoir." The fluid efficiency is the percentage of fluid that is still in the fracture at any point in time, when compared with the total volume injected at the same point in time. The concept of fluid loss has been used to determine fracture area. If too much fluid leaks off, the fluid has a low efficiency (10 to 20%) and the created fracture volume will be only a small fraction of the total volume injected. However, if the fluid efficiency is too high (80 to 90%), the fracture will not close rapidly after the treatment and cannot keep the proppant in place. Ideally, a fluid efficiency of 40 to 60% will provide an optimum balance between creating the fracture and having the fracture close down after the treatment to hold proppant in place.

In most low-permeability reservoirs, fracture-fluid loss and efficiency are controlled by the formation permeability. In high-permeability formations, a fluid-loss additive is often added to the fracture fluid to reduce leakoff and improve fluid efficiency. In naturally fractured or highly cleated formations, the leakoff can be extremely high, with efficiencies down in the range of 10 to 20%, or less. To fracture naturally fractured formations, the treatment often must be pumped at high injection rates with fluid-loss additives to stimulate a fracture network.

Categories of Fracturing Fluids

The categories of fracturing fluids currently available consist of:

Viscosified water-based fluids
Nonviscosified water-based fluids
Gelled oil-based fluids
Acid-based fluids
Foam fluids Water-Based Fracturing Fluids—Uncrosslinked Polymers and "Slick Water"

A common practice in the hydraulic fracturing of gas-producing reservoirs is the use of non-viscous "slick water"

fluids pumped at high rates (>60 bpm) to generate narrow fractures with low concentrations of proppant. In recent years, these treatments have become a standard technique in fracture stimulation of several U.S. shales, including the Barnett, Marcellus, and Haynesville and yield economically viable production. The low proppant concentration, high fluid-efficiency, and high pump rates in slick water treatments yield highly complex fractures. Additionally, compared to a traditional bi-wing fracture, slick water fractures often find the primary fracture connected to multiple sets (usually 2-3 sets) of natural fractures, which were formed in different geological environments and present various properties including orientation, frictional resistance, density and size. Coupled with multistage fracture completions and multiple wells collocated on a pad, complex fracture networks yield a high degree of reservoir contact area.

The most critical chemical additive for slick water-fracture execution is the friction reducer (FR). The high pump rates for slick water treatments (often 60-100 bbl/minute) necessitate the action of FR additives to reduce friction pressure up to 70%. This effect helps to moderate the pumping pressure to a manageable level during proppant injection. Common chemistries for friction reduction include polyacrylamide derivatives and copolymers added to water at low concentrations. Additional additives for slick water fluids may include biocide, surfactant (wettability modification), scale inhibitor, and others. The performance (friction reduction) of slick water fluids are generally less sensitive to mix-water quality, a large advantage over many conventional gelled fracturing fluids. However in high-salinity mix-water, many FR additives may see a loss in achievable friction reduction. Other advantages and disadvantages of slick water fluids and execution (compared to that of gelled fracturing fluids) are detailed below:

Advantages:
High retained conductivity, due to no filtercake present.
Reduced sensitivity to salinity and contaminants in mix-water.
Reduced number of fluid additives required for slick water fracturing fluid. Disadvantages:
Larger volumes of water often required for fracture design (compared to "gelled" fracturing fluids).
Larger horsepower requirement (to maintain high pump rates, 60-110 bpm).
Limited fracture-width (due to low maximum concentration proppant in low viscosity).
Reduced %-flowback-water recovery (due to imbibition of fracturing fluid in complex fracture network far from wellbore).
Limitation to fine-mesh propping agents (due to reduced ability of nonviscous fluids in transport of large proppants).

As the anticipated proppant-suspension capacity of slick water fluids is quite low, a complementary solution is the use of linear (uncrosslinked) gels. These fluids, based on uncrosslinked solutions of polysaccharides (i.e., guar, derivatized-guar, HEC, xanthan), have viscosities of up to 100 cP at 100 sec$^{-1}$ at surface temperature, which depend on polymer concentration. As this viscosity is several orders of magnitude higher than slick water, linear gels have improved proppant-suspension. When uncrosslinked gels are used in late-slurry stages of a fracturing treatment (where the pad and early-slurry stages used slick water), these are often referred to as "hybrid" fracturing treatments. [Note that "hybrid" may also refer to fracture treatments using crosslinked-gel to follow slick water, crosslinked-gel following linear/un-crosslinked, and other variations]

Polymers are used to viscosify the fluid. Crosslinkers are used to change the viscous fluid to a pseudoplastic fluid. Biocides are used to kill bacteria in the mix water. Buffers are used to control the pH of the fracture fluid. Surfactants are used to lower the surface tension. Fluid-loss additives are used to minimize fluid leakoff into the formation. Stabilizers are used to keep the fluid viscous at high temperature. Breakers are used to break the polymers and crosslink sites at low temperature.

Slick water or slick water fracturing is a method or system of hydro-fracturing that involves adding chemicals to water to increase the fluid flow. It is a fracture method that relies on high volumes of water and minimal chemical additives. Fluid can be pumped down the wellbore as fast as 100 bbl/min. to fracture the shale. Without using slick water, the top speed of pumping is around 60 bbl/min. Slick water fracturing methods were used before gels and high viscosity fluids became the industry standard for most fracturing designs, but the simple design of a slick water fracturing has proven to produce a more complex fracture network in certain formations—e.g. the middle Bakken formation.

The process involves injecting friction reducers, usually a polyacrylamide. Biocides, surfactants and scale inhibitors can also be in the fluid. Friction reducers speed the mixture. Biocides such as bromine prevent organisms from clogging the fissures and creating slime downhole. Surfactants keep the sand suspended. Methanol and naphthalene can be used for biocides. Hydrochloric acid and ethylene glycol may be utilized as scale inhibitors. Butanol and ethylene glycol monobutyl ether (2-BE) are used in surfactants. Slick water typically uses more water than earlier fracturing methods—between one and five million gallons per fracturing operation.

Other chemical compounds sometimes used include benzene, chromium and a host of others. Many of these are known to be toxic and have raised widespread concern about potential water contamination. This is especially true when the wells undergoing slick water hydro-fracturing are located near aquifers that are being used for local drinking water. Hydro-fracturing activity is heavily regulated by state agencies.

In summary, slick water is a water-based fluid and proppant combination that has low-viscosity. It is typically used in highly-pressurized, deeper shales, while fracturing fluids using nitrogen foam are more common in shallow shales and those that have lower reservoir pressure.

There are primarily three types of fracturing fluids currently used. These are water frac or slick water, linear gel, and crosslinked gel. All three of these frac fluids have different properties and applications.

Water frac is water containing a friction reducer and possibly a biocide, surfactant, breaker or clay control additive. This fluid has a low viscosity of 2-3 cP, which requires a high pump rate to transport proppant. Small proppant size like 40/70 is common with this fluid due to its low viscosity. Water frac is the least damaging to the proppant pack of the three frac fluid types and it is commonly used in gas wells.

Linear gel is water containing a gelling agent like guar, HPG, CMHPG, or xanthan. Other possible additives are buffers, biocide, surfactant, breaker, and clay control. This fluid has a medium viscosity of 10-30 cP, which results in improved proppant transport and wider frac compared to water frac fluid. Medium proppant size like 30/50 is common with this fluid. Linear gel is more damaging to the proppant pack than water frac and it is commonly used in both gas and oil wells.

Cross-linked gel is water containing any of the gelling agents used in linear gel and a crosslinker like boron (B), zirconium (Zr), titanium (Ti) or aluminum (Al). Other possible additives are buffers, biocide, surfactant, breaker, and clay control. This fluid has a high viscosity of 100-2500 cP at $100^{-1}$ R1:B5 bob configuration, which results in better proppant transport and wider fracs compared to linear gel fracturing fluid. Large proppant sizes like 20/40 and 16/30 are common with this fluid especially at low pump rates such as <60 BPM. Cross-linked gel is more damaging to the proppant pack than linear gel and it is commonly used in oil and high liquid wells because of its common residual of 7-12%.

Other less common fracturing fluids include gelled oil, gelled acid, foamed oil with nitrogen, foamed water with nitrogen or carbon dioxide, and gelled LPG.

Polyacrylamide is a friction reducer used to "slick" the water to minimize friction and lower the power required to pump the fracturing fluid. Petroleum distillates and hydrotreated light petroleum distillate are used as carrier fluids for the polyacrylamide friction reducer. Methanol and ethylene glycol are used as product stabilizers or winterizing agents.

Guar gum and a polysaccharide blend are gelling agents used to thicken the water in order to suspend the sand (proppant). Petroleum distillates and hydro-treated light petroleum distillate are used as carrier fluids for guar gum in liquid gels.

Given today's technology, chemicals must be used in hydraulic fracturing to ensure the producing formation is effectively treated. General hydraulic fracturing chemical usage including the types of chemicals, their uses in the process and the result of their use are discussed below.

Guar gum is a galactomannan—a polysaccharide consisting of a mannose backbone with galactose side groups. It is primarily the ground endosperm of guar beans and is typically produced as a free-flowing, off-white powder. It is known that guar can stiffen water to the extent that a mixture is able to carry sand into horizontal sections of wells and permit fracturing operations therein.

Guar gum shows a clear, low-shear plateau on the flow curve and is strongly shear thinning. The rheology of guar gum is typical for a random coil polymer. It does not show the very high low-shear plateau viscosities seen with more rigid polymer chains such as xanthan gum. It is very thixotropic above 1% concentration, but below 0.3%, the thixotropy is slight. Guar gum shows viscosity synergy with xanthan gum. Guar gum and micellar casein mixtures can be slightly thixotropic if a bi-phase system forms.

Guar gum is economical because it has almost eight times the water-thickening potency of cornstarch and only a small quantity is needed for producing sufficient viscosity. Thus, it can be used in various multiphase formulations: as an emulsifier because it helps to prevent oil droplets from coalescing, and/or as a stabilizer because it helps to prevent solid particles from settling. Guar gum is a viscosifier with very favorable rheological properties. It has a particularly useful ability to form breakable gels when cross-linked with boron. This makes it extremely valuable for hydraulic fracturing.

Fracturing entails the pumping of sand-laden fluids into an oil or natural gas reservoir at high pressure and at a high flow rate. This produces cracks in the reservoir rock and then props the cracks open. Water alone is too "thin" to be effective at carrying proppant sand, so guar gum is one of the ingredients often added to thicken the slurry mixture and improve its ability to carry proppant. There are several properties which are important: 1. Thixotropic: the fluid should be thixotropic, meaning it should gel within a few hours. 2. Gelling and de-gelling: The desired viscosity changes over the course of a few hours. When the fracturing slurry is mixed, it needs to be thin enough to make it easier to pump. Then, as it flows down the pipe, the fluid needs to gel in order to support the proppant and carry it deep into the fractures. After that process, the gel has to break down so that the fracturing fluid can be recovered by flow back but leave the proppant behind. This requires a chemical process which produces then breaks the gel cross-linking at a predictable rate.

Guar+boron+proprietary chemicals can accomplish both of these goals at once.

Manufacturers define different grades and qualities of guar gum by the particle size, the viscosity generated with a given concentration, and the rate at which that viscosity develops. Coarse-mesh guar gums will typically, but not always, develop viscosity more slowly. They may achieve a reasonably high viscosity, but will take longer to achieve. On the other hand, they will disperse better than fine-mesh, all conditions being equal. A finer mesh, such as a 200 mesh, requires more effort to dissolve.

Modified forms of guar gum are available commercially, including enzyme-modified, cationic and hydropropyl guar Guar Gum and Guar Derivatives in Fracturing Guar gums are preferred as thickeners for Enhanced Oil Recovery (EOR), guar gum and its derivatives account for most of the gelled fracturing fluids. Guar is more water-soluble than other gums, and it is also a better emulsifier, because it has more galactose branch points. Guar gum shows high low-shear viscosity, but it is strongly shear-thinning. Being non-ionic, it is not affected by ionic strength or pH but will degrade at low pH at moderate temperature (pH 3 at 50° C.). Guar's derivatives demonstrate stability in high temperature and pH environments. Guar use allows for achieving exceptionally high viscosities, which improves the ability of the fracturing liquid to transport proppant. Guar hydrates fairly rapidly in cold water to give highly viscous pseudoplastic solutions of, generally, greater low-shear viscosity than other hydrocolloids. The colloidal solids present in guar make fluids more efficient by creating less filter cake. Proppant pack conductivity is maintained by utilizing a fluid that has excellent fluid loss control, such as the colloidal solids present in guar gum.

Guar has up to eight times the thickening power of starch. Derivatization of guar gum leads to subtle changes in properties, such as, decreased hydrogen bonding, increased solubility in water-alcohol mixture, and improved electrolyte compatibility. These changes in properties result in increased use in different fields, like textile printing, explosives, and oil-water fracturing applications.

Crosslinking Guar

Guar molecules have a tendency to aggregate during the hydraulic fracturing process, mainly due to intermolecular hydrogen bonding. These aggregates are detrimental to oil recovery because they clog the fractures, restricting the flow of oil. Cross-linking guar polymer chains prevents aggregation by forming metal-hydroxyl complexes. The first cross-linked guar gels were developed in the late '60's. Several metal additives have been used for crosslinking, among them are chromium, aluminum, antimony, zirconium, and boron. Boron, in the form of B(OH)3, reacts with the hydroxyl groups on the polymer in a two-step process to link two polymer strands together to form bis-diol complexes.

A one-to-one 1,2 diol complex and a one-to-one 1,3 diol complex place the negatively charged borate ion onto the polymer chain as a pendant group. Boric acid itself does not apparently complex to the polymer so that all bound boron is negatively charged. The primary form of crosslinking may be due to ionic association between the anionic borate complex and adsorbed cations on the second polymer chain. The development of cross-linked gels was a major advance in fracturing fluid technology. Viscosity is enhanced by tying together the low molecular weight strands, effectively yielding higher molecular weight strands and a rigid structure. Cross-linking agents are added to linear polysaccharide slurries to provide higher proppant transport performance, relative to linear gels.

Lower concentrations of guar gelling agents are needed when linear guar chains are cross-linked. It has been determined that reduced guar concentrations provide better and more complete breaks in a fracture. The breakdown of a cross-linked guar gel after the fracturing process restores formation permeability and allows increased production flow of petroleum products When fracturing, viscosity plays a major role in providing sufficient fracture width to ensure proppant entrance into the fracture and minimize premature screen-out, carrying the proppant from the wellbore to the hydraulic fracture tip and further diverting the proppant into the fracture network, generating a desired net pressure to control hydraulic fracture height growth and natural fracture reactivation, and providing fluid loss control. The fluid used to generate the desired viscosity must be safe to handle, environmentally friendly, non-damaging to the fracture conductivity and to the reservoir permeability, easy to mix, inexpensive and able to control fluid loss. This is a very demanding list of requirements that has been recognized since the beginning of hydraulic fracturing.

The selection of a proper fracturing fluid begins with choosing the pad volume required to create the desired fracture geometry. This is typically followed by choosing how much viscosity the fluid needs to have in order to:

Provide sufficient fracture width to insure proppant entrance into the fracture and prevent premature screen-out.

Provide a desired net pressure to either treat some desired hydraulic fracture height growth or prevent breaking out into some undesirable zone for example water and control the extent of reactivated natural fracture network.

Provide carrying capability to transport proppant from the wellbore to the hydraulic fracture tip and deliver proppant from hydraulic fracture into complex natural fracture network.

Control fluid loss. In cases where a gel filter cake cannot form, the fracturing fluid viscosity (i.e. Cl) may be the main mechanism for fluid loss control. This choice system continues when it comes to selecting the appropriate fluid system for a propped or acid fracturing treatment. The considerations include:

Safe—The fluid should expose the on-site personnel to a minimal danger.

Environmentally Friendly—The composition of the fluid should be as "green" as possible.

Breaker—The fluid must "break" to a low viscosity so that it can flow back and allow cleanup of the fracture.

Cost Effective—The fluid must be economical and not drive the treatment cost to an unacceptable level.

Compatibility—The fluid must not interact and caused damage with the formation mineralogy and/or formation fluids.

Clean-up—The fluid should not damage the fracture conductive of the fracture or, to prevent water blocks, change the relative permeability of the formation. This becomes very important in low pressure wells or wells that produce very dry gas.

Easy to Mix—The fluid system must be easy to mix even under very adverse conditions.

Fluid Loss—The fluid needs to help control fluid loss. An ideal fluid should have fluid loss flexibility.

In summary, an ideal fracturing fluid would be one that has an easily measured controllable viscosity, controllable fluid loss characteristics, would not damage the fracture or interact with the formation fluid, would be completely harmless and inert and cost less than $4.00 per gallon. Unfortunately this is currently not possible, so compromises have to be made.

Of these factors the fluid viscosity is the major fluid-related parameter for fracture design and operation. However, how much viscosity is needed is often overestimated. Excessive viscosity increases costs, reduces time-efficiency for injection, raises treating pressure (which may cause undesired height growth and send fluid and proppant into non-productive zones), and can reduce fracture conductivity since many of the chemicals used to increase viscosity leave residue which damages the proppant permeability.

There are several types of fracturing fluids and a wide range of fluid additives.

The types of fluids include:
Water based fluids
Oil based fluids
Energized fluids
Multi-phase emulsions
Acid Fluids
Additives include:
Gelling agents
Crosslinkers
Breakers
Fluid loss additives
Bactericides
Surfactants and Non-emulsifying agents
Clay control additives.

The purpose and downhole result(s) of common additives for fracturing fluids are discussed more fully, below.

The vast majority of fracturing fluids used today use water as the base fluid. Generally, the components that make up cross-linked fracturing fluids include a polymer, buffer, gel stabilizer or breaker and a crosslinker. Each of these components is critical to the development of the desired fracturing fluid properties. The role of polymers in fracturing fluids is to provide fracture width, to suspend proppants, to help provide fracture width, to help control fluid loss to the formation, and to reduce friction pressure in the tubular goods. Guar gum and cellulosic derivatives are the most common types of polymers used in fracturing fluids. The first patent on guar cross-linked by borate was issued on Oct. 16, 1962 (U.S. Pat. No. 3,058,909). Metal-based crosslinking agents developed by DuPont for plastic explosive applications were found to be useful for manufacturing fracturing fluids for high temperature applications. Cellulosic derivatives are residue-free and thus help minimize fracturing fluid damage to the formation and are widely used in Frac and Pack applications. The cellulosic derivatives are difficult to disperse because of their rapid rate of hydration. Guar gum and its derivatives are easily dispersed but produce some residue when broken.

An acid may be added to help dissolve minerals and initiate cracks in the rock. Downhole, an acid reacts with minerals that are present in the formation to create salts, water, and carbon dioxide (i.e., is neutralized).

An acid/corrosion inhibitor may be added to protect well casing from corrosion. Downhole, it bonds to metal surfaces (i.e. pipe) downhole. Any remaining product not bonded is broken down by micro-organisms and consumed or returned in produced water.

A biocide may be added to eliminate bacteria in the water that can cause corrosive byproducts. Downhole, the biocide reacts with micro-organisms that may be present in the treatment fluid and formation. These micro-organisms break down the product with a small amount of the product returning in produced water.

The Base Carrier Fluid (water) creates the fracture geometry and suspends the proppant. Downhole, some of the Base Carrier Fluid stays in the formation while the remainder returns with natural formation water as "produced water" (actual amounts returned vary from well to well).

A "breaker" is an additive that allows a delayed break down of gels when required. Downhole, the breaker reacts with the "crosslinker" and "gel" once in the formation making it easier for the fluid to flow to the borehole. The reaction produces ammonia and sulfate salts which are returned in produced water.

Temporary or permanent clay stabilizers lock down clays in the shale structure. Downhole, they react with clays in the formation through a sodium-potassium ion exchange. This reaction produces sodium chloride which is returned in produced water. Clay stabilizers replace binder salts like calcium chloride, helping to keep the formation intact as the calcium chloride dissolves.

A crosslinker additive maintains the viscosity of the fracturing fluid as temperature increases. Downhole, it combines with the "breaker" in the formation to create salts that are returned in produced water A friction reducer is an additive that reduces friction effects (over base water) in pipes. Downhole, it remains in the formation where temperature and exposure to the "breaker" allows it to be broken down and consumed by naturally occurring micro-organisms. A small amount returns with produced water.

A gel additive may be used to thicken the water in order to suspend the proppant. Downhole, it combines with the "breaker" in the formation thus making it much easier for the fluid to flow to the borehole and return in produced water.

Iron control additives are iron-chelating agents that help prevent precipitation of metal oxides. Downhole, they reacts with minerals in the formation to create simple salts, carbon dioxide and water all of which are returned in produced water.

A non-emulsifier may be added to break or separate oil/water mixtures (emulsions). Downhole, a non-emulsifier is generally returned with produced water, but in some formations it may enter the gas stream and return in the produced natural gas.

A pH adjusting agent/buffer may be added to maintain the effectiveness of other additives such as cross-linkers. Downhole, it reacts with acidic agents in the treatment fluid to maintain a neutral (neither acidic nor alkaline) pH. Reaction products are mineral salts, water and carbon dioxide which are returned in produced water.

The propping agent (or "proppant") is added to keep fractures open allowing for hydrocarbon production. Downhole, it preferably stays in the formation, embedded in fractures (used to "prop" fractures open).

A scale inhibitor may be added to prevent scale in the pipe and the formation. Downhole, the product attaches to the formation. The majority of product returns with produced water while the remaining portion reacts with microorganisms that break down and consume the product.

A surfactant may be added to reduce the surface tension of the treatment fluid in the formation and thereby improve fluid recovery from the well after the fracturing operation is completed. Downhole, some surfactants are designed to react with the formation, some are designed to be returned with produced water or, in some formations, they may enter the gas stream and return in the produced natural gas.

Ammonium persulfate is often added to the fracturing fluids to break the polymer as it reaches temperature. The first patent (U.S. Pat. No. 3,163,219) on borate gel breakers was issued on Dec. 29, 1964.

Buffers are used in conjunction with polymers so that the optimal pH for polymer hydration can be attained. When the optimal pH is reached, the maximal viscosity yield from the polymer is obtained. The most common example of fracturing fluid buffers is a weak-acid/weak-base blend, whose ratios can be adjusted so that the desired pH is reached. Some of these buffers dissolve slowly allowing the crosslinking reaction to be delayed.

Gel stabilizers are added to polymer solutions to inhibit chemical degradation. Examples of gel stabilizers used in fracturing fluids include methanol, tri-ethanol amine (TEA) and various inorganic sulfur compounds. Other stabilizers are useful in inhibiting the chemical degradation process, but many interfere with the mechanism of crosslinking. The TEA and sulfur-containing stabilizers possess an advantage over methanol, which is flammable, toxic, and expensive and may cause poisoning of reactor tower catalysts.

Water Frac is composed of water, a clay control agent and a friction reducer. Sometimes a water recovery agent (WRA) is added to reduce any relative permeability or water block effects. The advantages of using a "Water Frac" are the low cost, ease of mixing and the ability to recover and reuse the water. The main disadvantage is the low viscosity which results in a narrow fracture width. Because the viscosity is low, the main proppant transport mechanism is velocity so water fracs are typically pumped at very high rates (60 to 120 bpm). Fluid loss is controlled by the viscosity of the filtrate which is close to that of water—i.e. 1.

Linear Gel is composed of water, a clay control agent and a gelling agent such as Guar, HPG or HEC. Because these gelling agents are susceptible to bacteria growth a bactericide or biostat is also added. Chemical breakers are also added to reduce damage to the proppant pack. WRA's are also sometimes used. The main advantage of a liner gel is its low cost and improved viscosity characteristics. Fluid loss is controlled by a filter cake which builds on the fracture face as the fluid loses fluid to the formation. The main disadvantage is, as with water fracs, the low viscosity which results in a narrow fracture width. The main disadvantage as compared to a water frac is that, because the returned water has residual breaker, the water is not reusable.

Crosslinked Gels are composed of the same materials as a linear gel with the addition of a crosslinker which increases the viscosity of the linear gel from less than 50 cps into the 100's or 1000's of cps range. The higher viscosity increases the fracture width so it can accept higher concentrations of proppant, reduces the fluid loss to improve fluid efficiency, improves proppant transport and reduces the friction pressure. This crosslinking also increases the elasticity and proppant transport capability of the fluid. Fluid loss is controlled by a filter cake which builds on the fracture face as the fluid loses fluid to the formation. A full description of the types of crosslinkers used, the chemistry and the mechanism of crosslinking is provided in the companion paper on fracturing fluid components.

Oil Based Fluids are used on water-sensitive formations that may experience significant damage from contact with water based fluids. The first fracturing fluid used to fracture a well employed gasoline as the base fluid, palm oil as the gelling agent and naphthenic acid as the crosslinker—i.e. napalm. Although some crude oils have particulates which could build a filter cake, fluid loss is generally considered to be "Viscosity-Controlled—i.e. C-II". There are some disadvantages in using gelled oils. Gelling problems can occur when using high viscosity crude oils or crude oils which contain high levels of naturally occurring surfactants. When using refined oils such as diesel, the cost is very high and the oil must be collected at the refinery before any additives such as pour point depressants, engine cleaning surfactants, etc. are added. Also, there are greater concerns regarding personnel safety and environmental impact, as compared to most water-based fluids.

Foam/Poly Emulsions are fluids that are composed of a material that is not miscible with water. This could be nitrogen, carbon dioxide or a hydrocarbon such as propane, diesel or condensate. These fluids are very clean, have very good fluid loss control, provide excellent proppant transport and break easily simply via gravity separation. Poly Emulsions are formed by emulsifying a hydrocarbon such as condensate or diesel with water such that the hydrocarbon is the external phase. The viscosity is controlled by varying the hydrocarbon/water ratio. Foams made with nitrogen or carbon dioxide are generally 65 to 80% (termed 65 to 80 quality) gas in a water carrying media which contains a surfactant based foaming agent. Sometimes $N_2$ or $CO_2$ are added at a lower concentration (20 to 30 quality) to form "Energized Fluids". This is done to reduce the amount of water placed on the formation and to provide additional energy to aid in load recover during the post-frac flow back period. Nitrogen can dissipate into the reservoir quite quickly, so fluids energized with $N_2$ should be flowed back as soon as the fracture is closed. $CO_2$, under most conditions, is in a dense phase at static, downhole conditions (prior to the well being placed in production), so is less susceptible to dissipation. $CO_2$ will dissolve in crude oil and thus may act to reduce the crude viscosity which, again, improves clean-up and rapid recovery. When $N_2/CO_2$ are added in qualities greater than 80, the resulting mixture is termed a mist with a "0" viscosity. This quality is normally not used in fracturing. The main disadvantage of these fluids is safety i.e. pumping a gas at high pressure or in the case of poly-emulsions and gelled propane, pumping a flammable fluid. $CO_2$ creates an additional hazard in that it can cause dry ice plugs as pressure is reduced. These fluids are generally also more expensive and the gases may not be available in remote areas.

Characterization of Fracturing Fluids

Fluid viscosity for treatment design is determined from laboratory tests and is reported in service company literature. The ideal experiment for describing fluid flow in a fracture would be to shear a fluid between two plates which are moving parallel and relative to one another. Such an ideal test is not feasible for day-to-day applications so a rotating "cup and bob" viscometer know as a "Couette" viscometer is used. API standard RP39 and ISO 13503-1 fully describe the current testing procedures used by the industry. The viscometer uses a rotating cup and a stationary bob with a gap between the two that simulates the fracture.

The tests described above measure the shear stress generated by specific increasing shear rates (called a ramp), and this data is converted to a "viscosity" value by using a rheological model to describe fluid behavior.

Another factor affecting viscosity is the addition of proppant to the fracturing fluid to from slurry. For a Newtonian fluid, the increase in viscosity due to proppant can be calculated from an equation originally developed by Albert Einstein. For example, it can be shown that an 8-ppg slurry has an effective viscosity about 3 times that for the fracturing fluid alone. This increased viscosity will increase net treating pressure and may significantly impact treatment design. This increase in slurry viscosity also retards proppant fall.

The rate of fall for proppant is normally calculated using Stokes' Law. Stokes' Law is generally not valid for Reynolds numbers much in excess of unity or for hindered settling due to proppant clustering in static fluids. For cross-linked fluids the actual fall rate may be much less than Stokes' Law. Lab data shows that proppant in cross-linked fluids falls at a rate which is reduced by about 80% when compared to non-cross-linked linear gels with the same apparent viscosity. The rate of proppant fall in foams and emulsions is also much less than would be indicated by using the apparent viscosity in Stokes' Law. Another factor affecting proppant fall is the particle concentration which increases slurry viscosity. This retards or hinders the proppant fall because of clustered settling in static fluids. Finally the slurry flowing down a fracture is generally much lower that the shear rate of 170 or 511 $\sec^{-1}$ used to report the fluid apparent viscosity.

When all of these factors are put together they can significantly affect the viscosity. Treating pressure is fairly insensitive to viscosity inasmuch as the pressure is proportional to viscosity raised to the ¼ power. However, the viscosity estimate can easily be off by an order of magnitude which can have a drastic impact on treatment behavior. An order of magnitude would be (10¼=1.8) so the treating pressure would be 80% greater than anticipated. This could cause undesired height growth and result in treatment failure. For fracturing jobs where the control of net pressure to prevent height growth is important, fluid viscosity is a critical parameter.

What is needed is a fracturing system with the pumpability of a slick water method and the proppant-carrying ability of a method employing a cross-linked gel. The present invention solves this problem.

BRIEF SUMMARY OF THE INVENTION

Disclosed hereinbelow is a method of hydraulic and natural fracture optimization using a novel geomechanical and fluid design.

The present invention comprises not only a chemical component but rather a complete system and application that may encompass any type of viscous fluid ranging from natural polymers to synthetics. A system according to the present invention comprises the targeted use of a low-viscosity fluid that is capable of carrying proppant ranging from silica white, resin coated, curable and ceramic proppants at concentrations ranging from 0.1 lb/gl-20 lbs/gl. In an exemplary embodiment, the actual viscosity of the demonstrated fluid encompasses 20 cP-150 cP at ambient temperature at 511 1/s with R1:B1 bob configuration and equivalent viscosity with R1:B5 and R1:B2 configurations.

It has been found that, a viscosifying agent that comprises a copolymer polymerized from an acrylic acid monomer and a monomer selected from:

a) about 20% to about 80% by weight of at least one carboxylic acid monomer comprising acrylic acid, methacrylic acid, itaconic acid, fumaric acid, crotonic acid, aconitic acid, or maleic acid, or combinations thereof;
b) about 80% to about 15% by weight of at least one $C_1$ to $C_5$ alkyl ester and/or at least one $C_1$ to $C_5$ hydroxyalkyl ester of acrylic acid or methacrylic acid;
c) about 0.01% to about 5% by weight of at least one crosslinking monomer; and optionally
d) about 1% to about 35% by weight of at least one $\alpha,\beta$-ethylenically unsaturated monomer, may be used to produce a fracturing fluid that has the pumpability of a slick water fluid and the proppant-carrying ability of a cross-linked gel.

BRIEF DESCRIPTION OF THE SEVERAL VIEWS OF THE DRAWING(S)

Figure 3A:
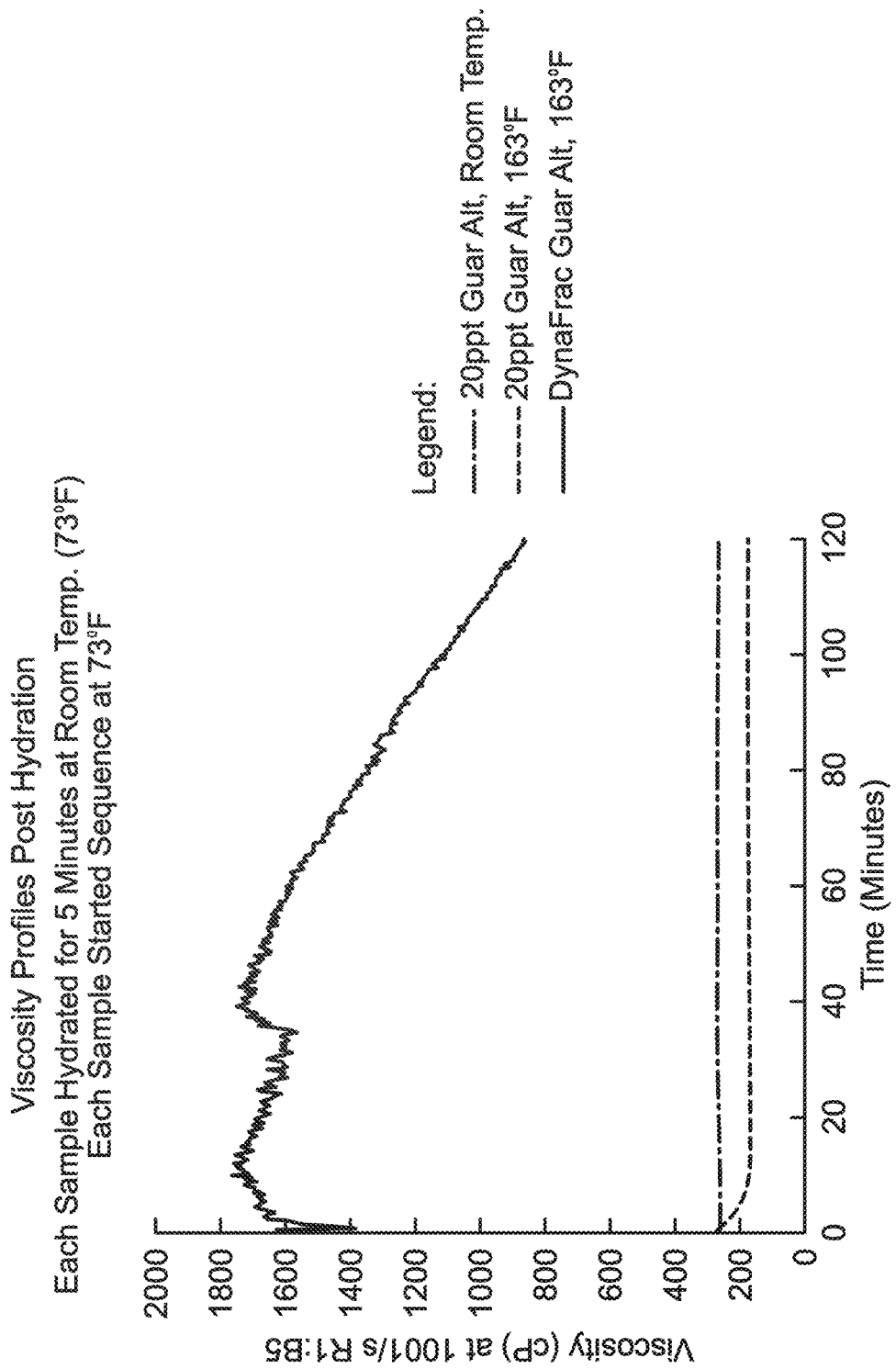
FIG. 3A is a graph showing the viscosity of certain fluids versus post-hydration time.
Figure 3B:
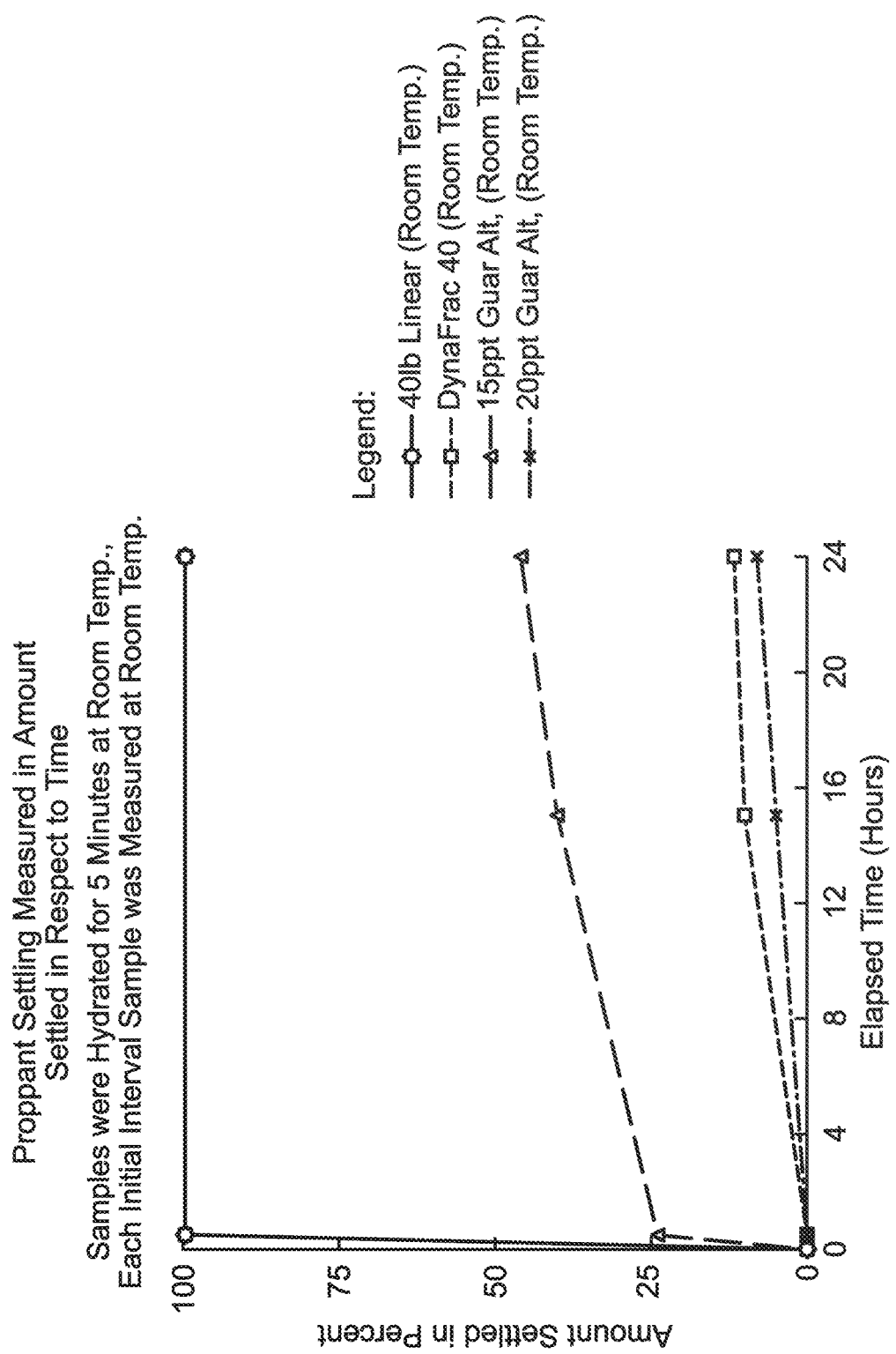
Figure 3B:
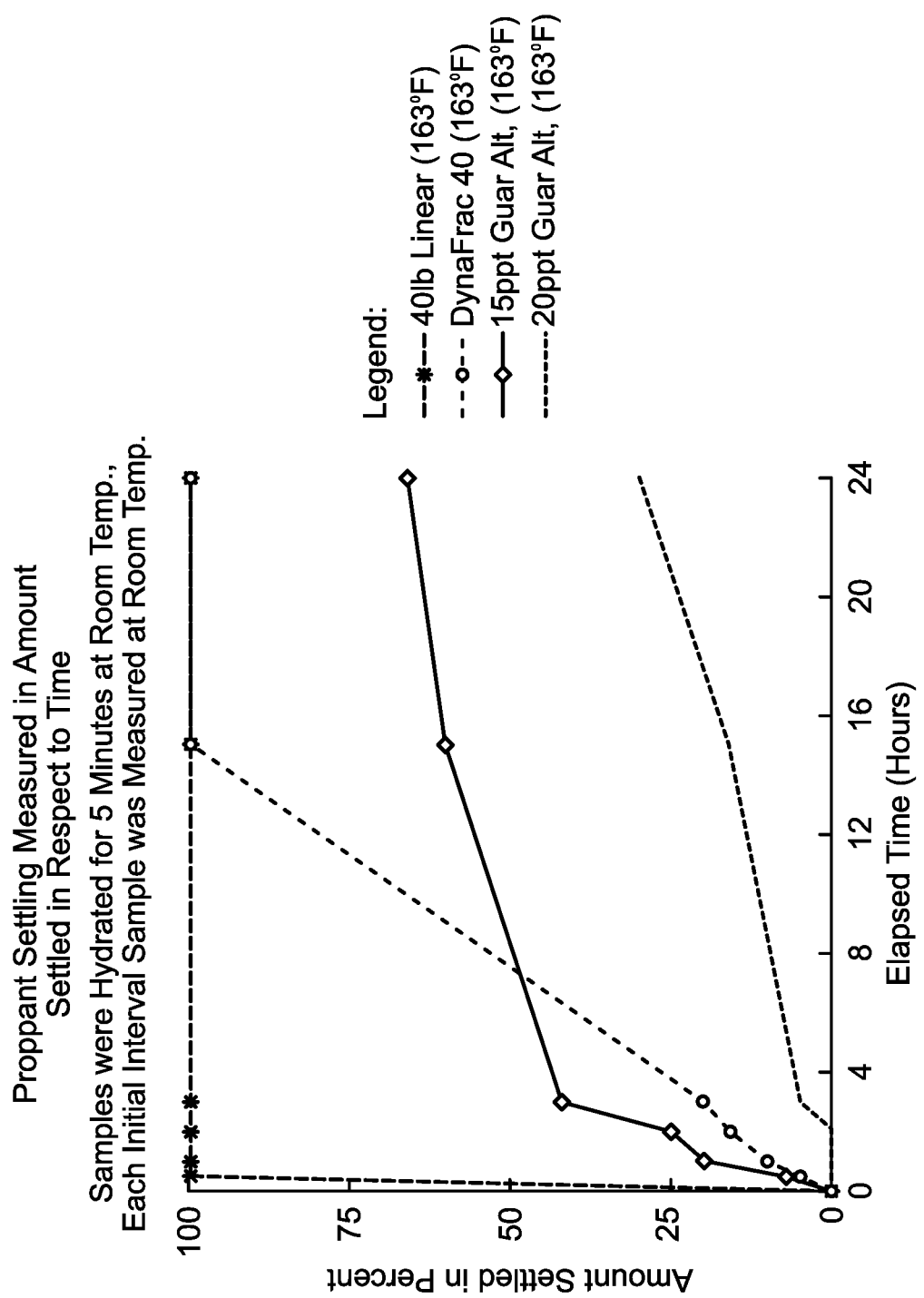

FIGS. 3B and 3B' are graphs showing proppant settling versus time for various fracturing fluids.

Figure 4:
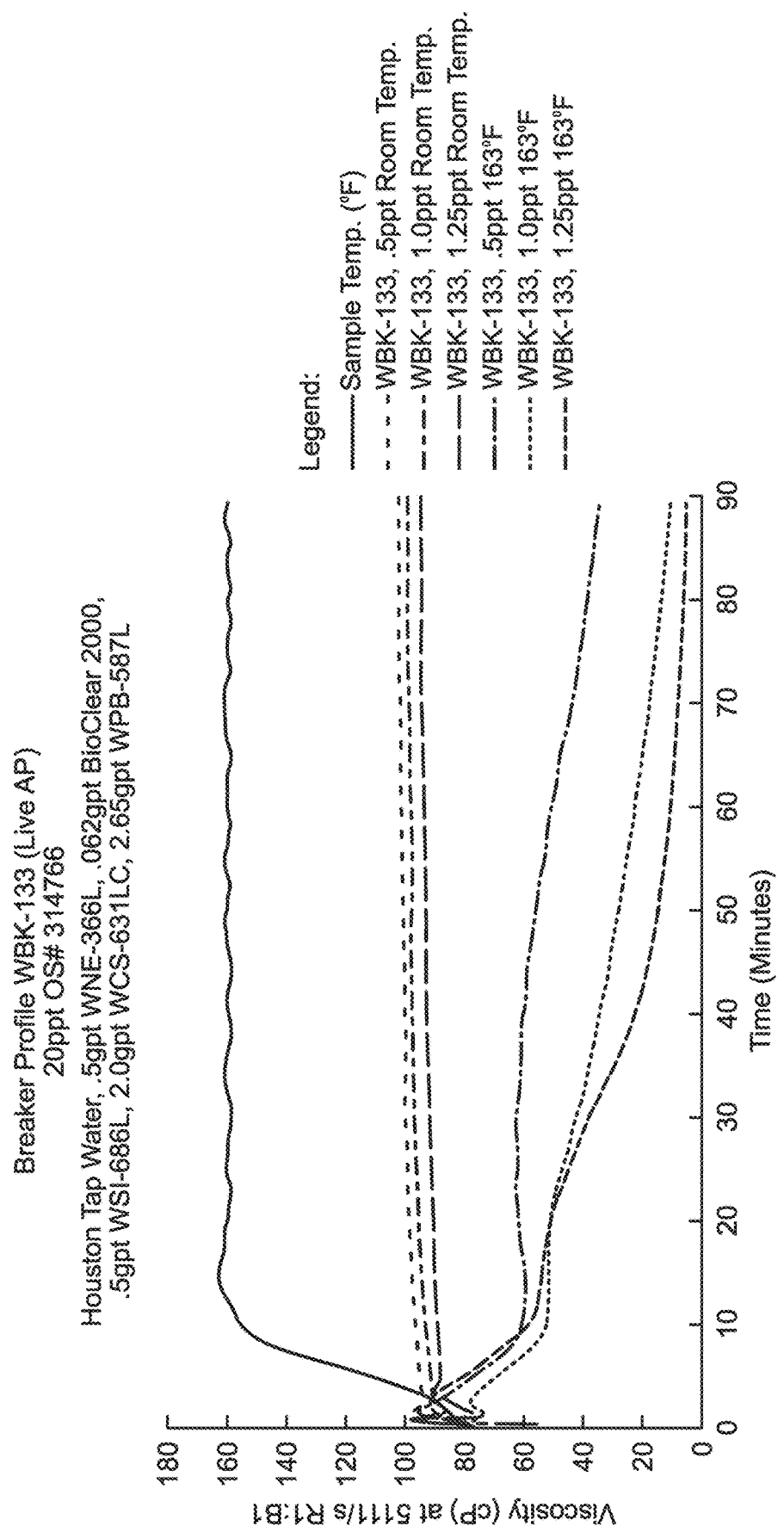

FIG. 4 is a graph showing breaker profiles for various fracturing fluids as viscosity versus time.

Figure 5:
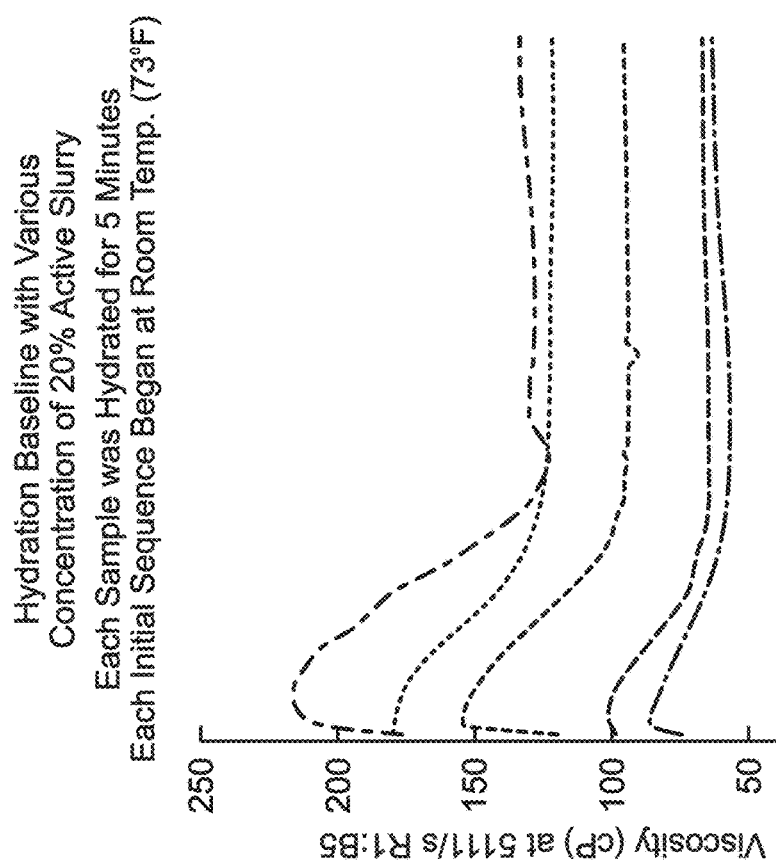

FIG. 5 is a graph showing hydration baselines for various additive concentrations as viscosity versus time.

FIG. 5 is a graph showing hydration baselines for various additive concentrations as viscosity versus time.

FIGS. 6A, 6A', and 6A" are the graphical output of a computer simulation of a fracturing operation using a conventional high-viscosity fracturing fluid.

FIGS. 6B, 6B', and 6B" are the graphical output of a computer simulation of a fracturing operation using a conventional low-viscosity fracturing fluid.

FIGS. 6C, 6C', and 6C" are the graphical output of a computer simulation of a fracturing operation using a fracturing fluid according to an embodiment of the invention.

Figure 7A:
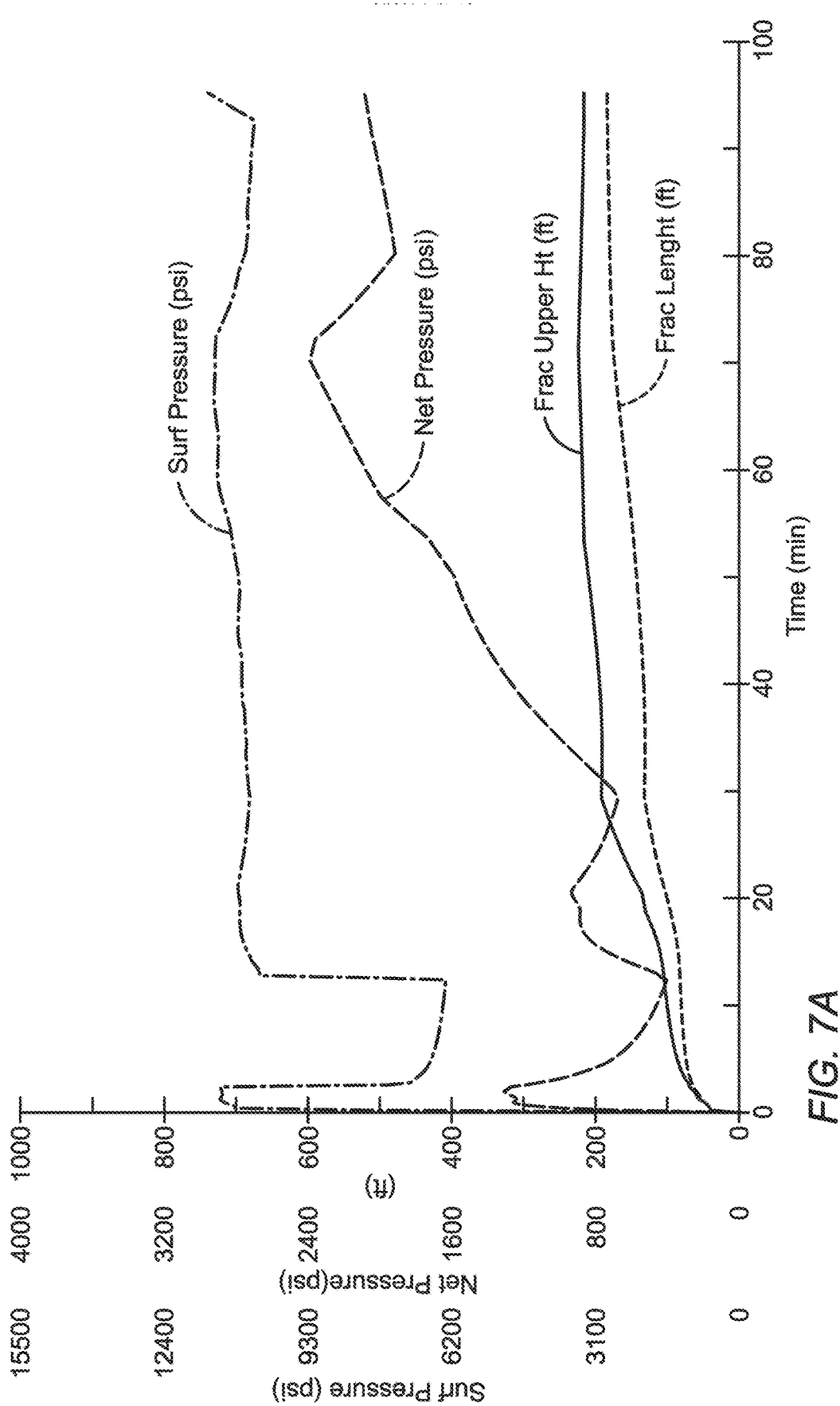
Figure 7A:
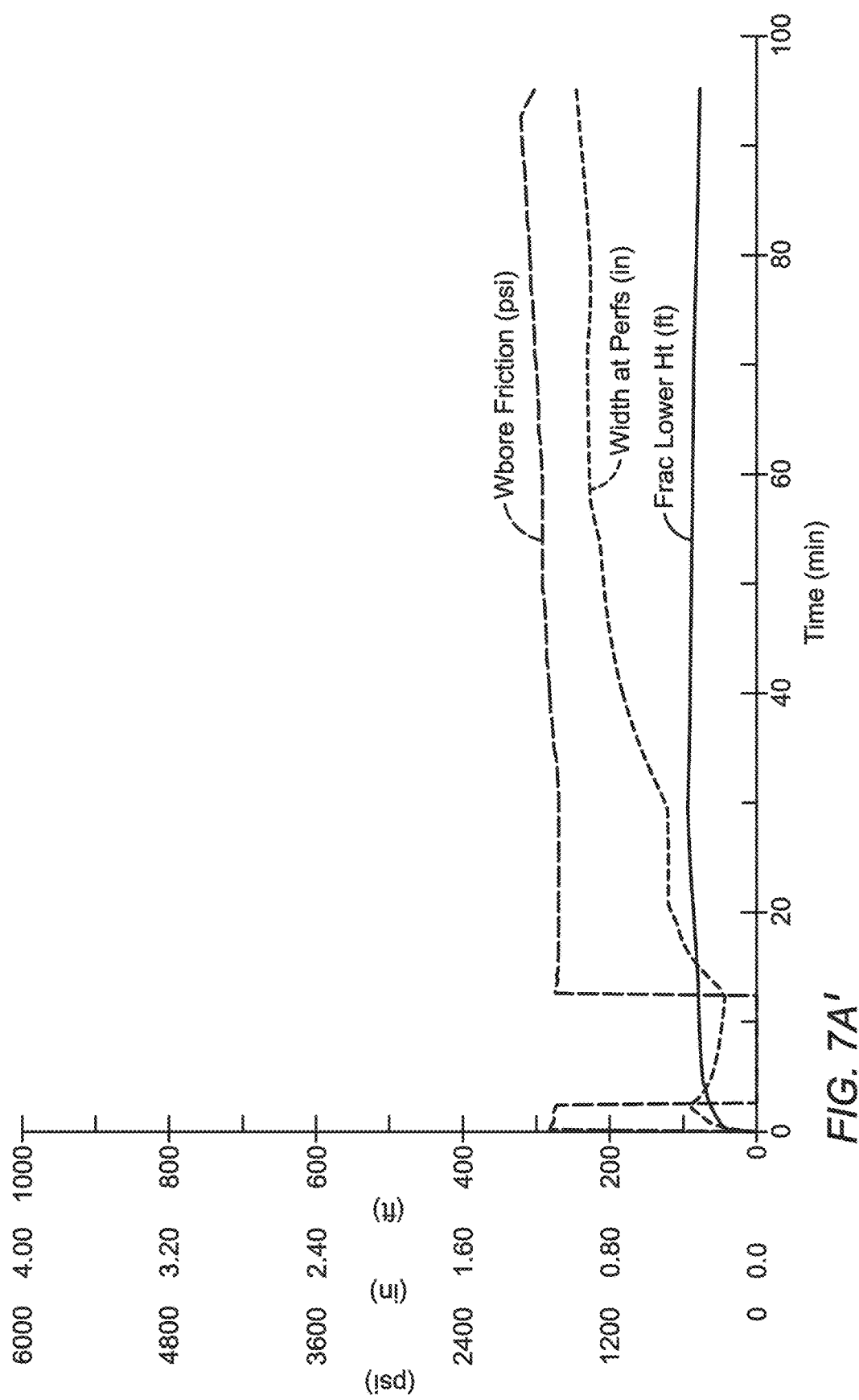

FIGS. 7A and 7A' are the graphical output of a computer simulation of surface treating pressure calculations and related fracture dimensions for a fracturing fluid according to the invention used at a level of 15 lbs. of the polymer per 1000 gallons of water (PPT).

Figure 7B:
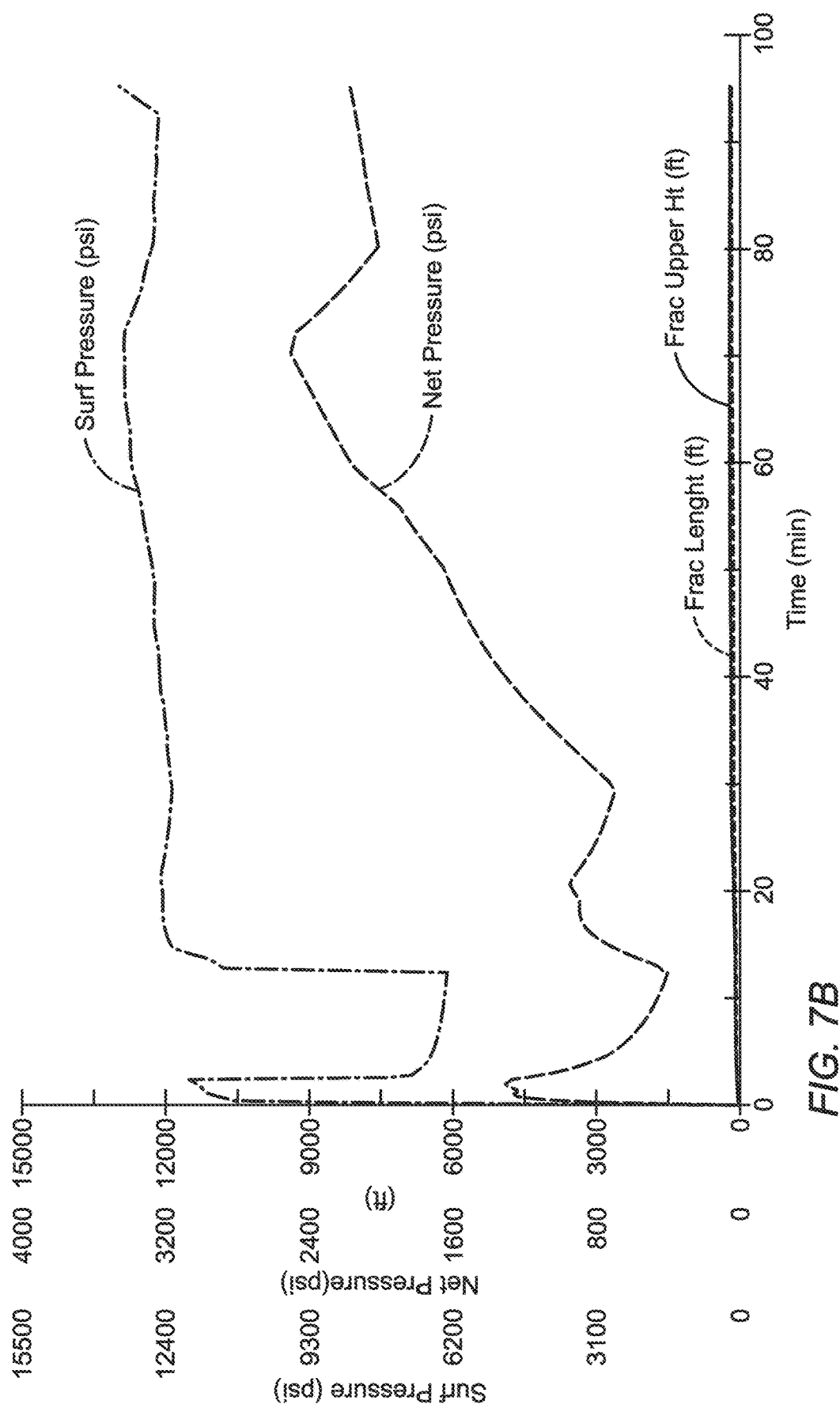
Figure 7B:
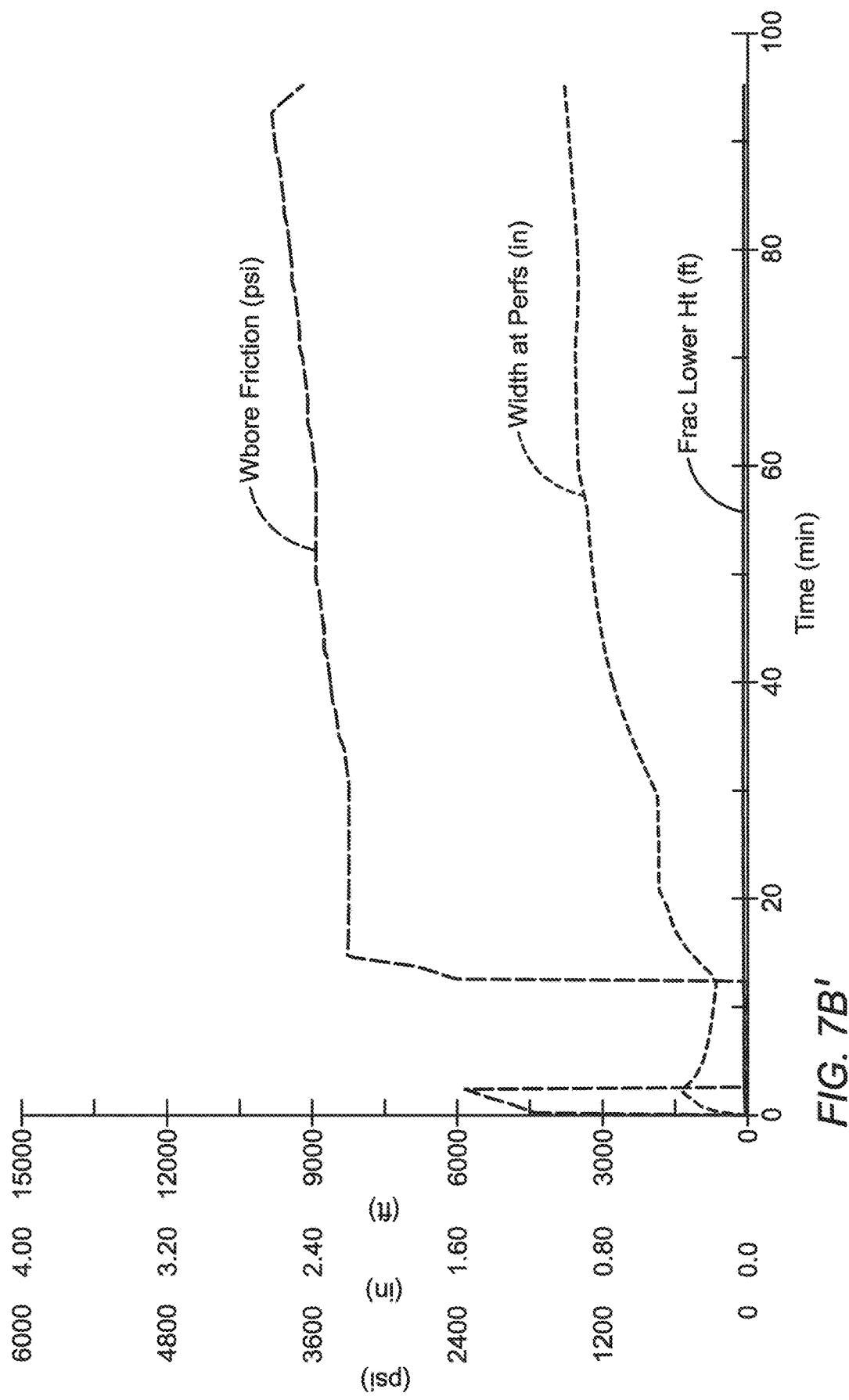

FIGS. 7B and 7B' are the graphical output of a computer simulation of surface treating pressure calculations and related fracture dimensions for a linear gel fracturing fluid system that comprises natural guar or a low-residue hydroxypropyl guar (HPG) at a level of 40 lbs. per 1000 gallons of water.

Figure 7C:
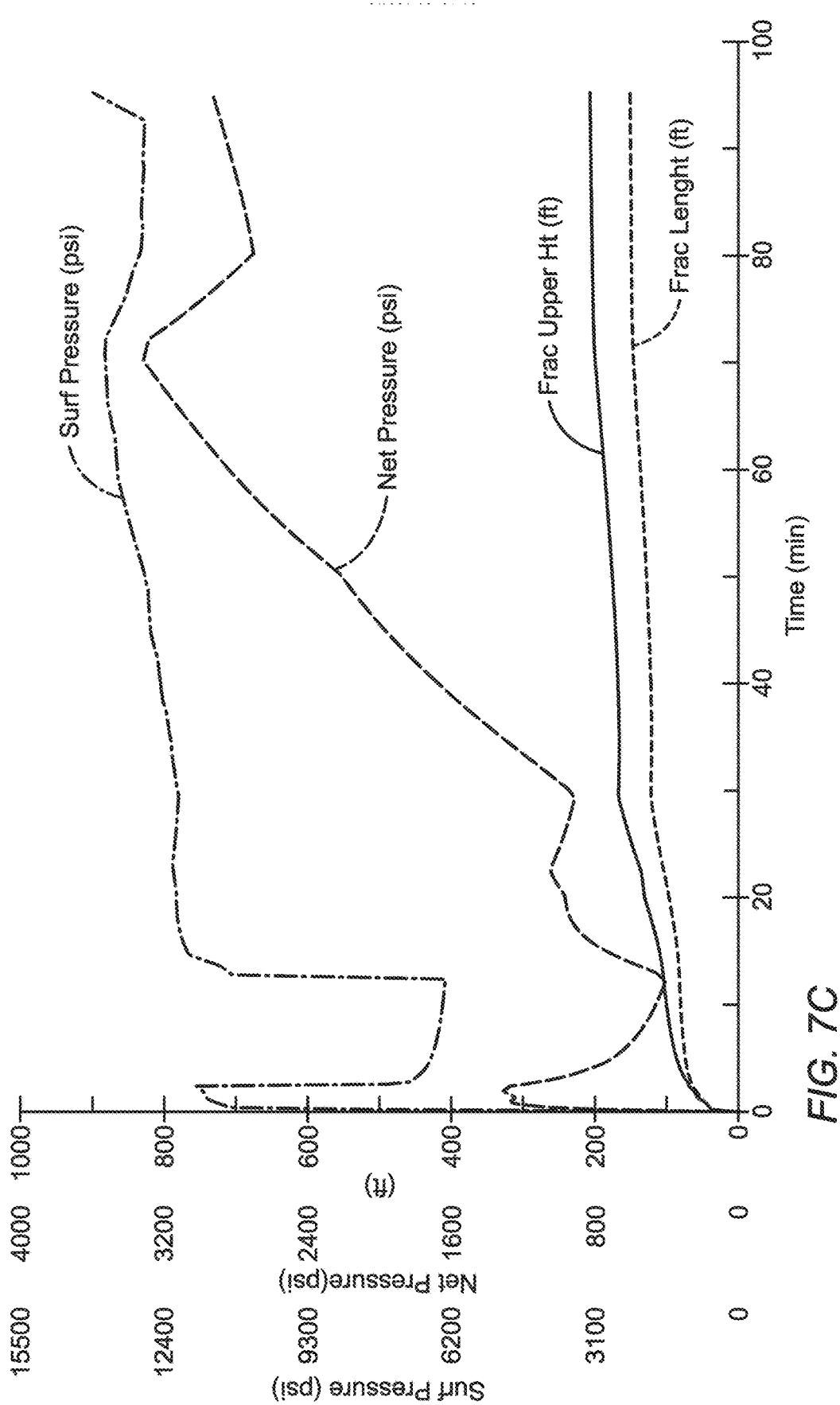
Figure 7C:
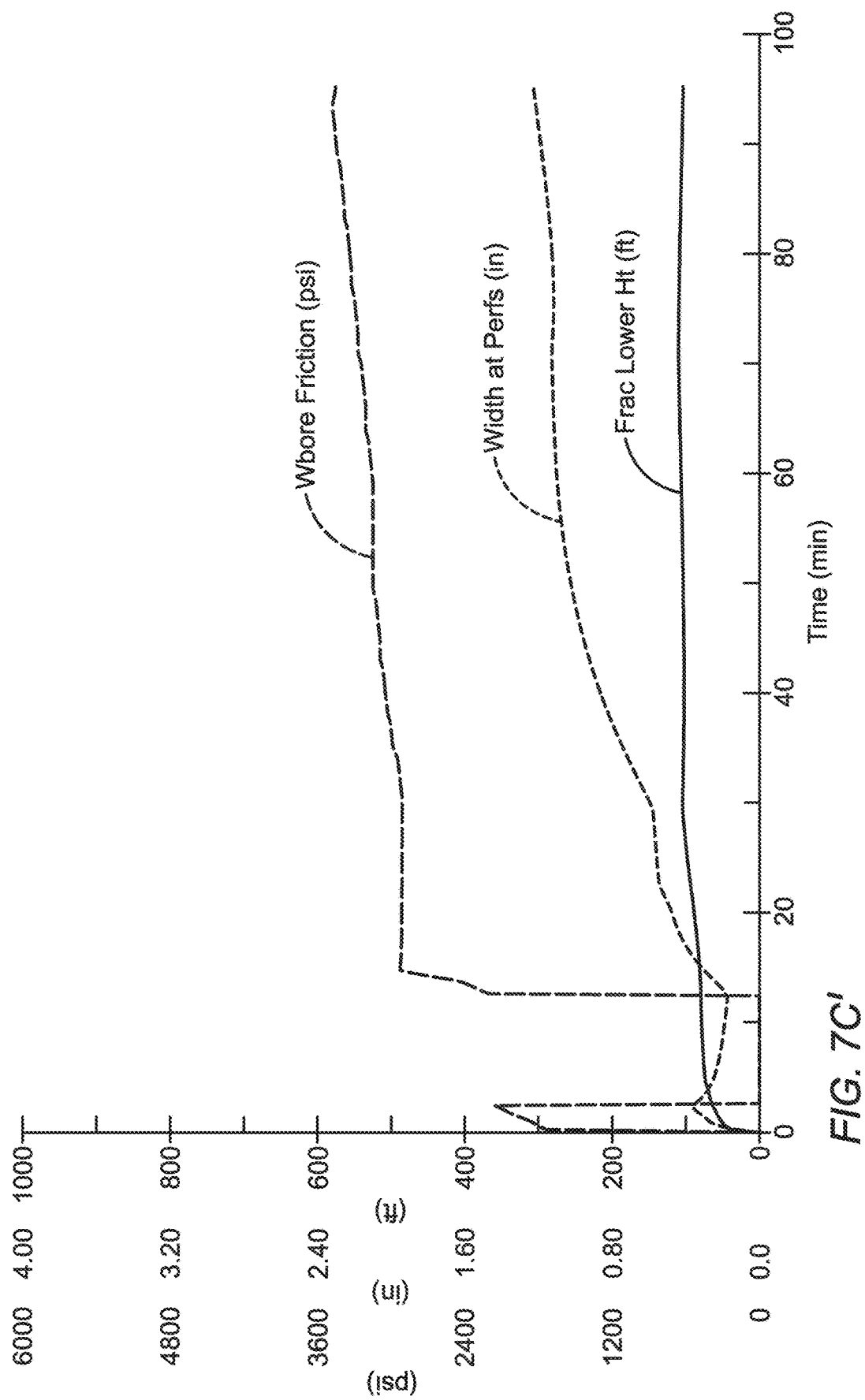

FIGS. 7C and 7C' are the graphical output of a computer simulation of surface treating pressure calculations and related fracture dimensions for a CHMPG/zirconium (carboxymethylhydroxypropyl guar gel) fracturing fluid system at a level of 40 lbs. per 1000 gallons of water.

Figure 7D:
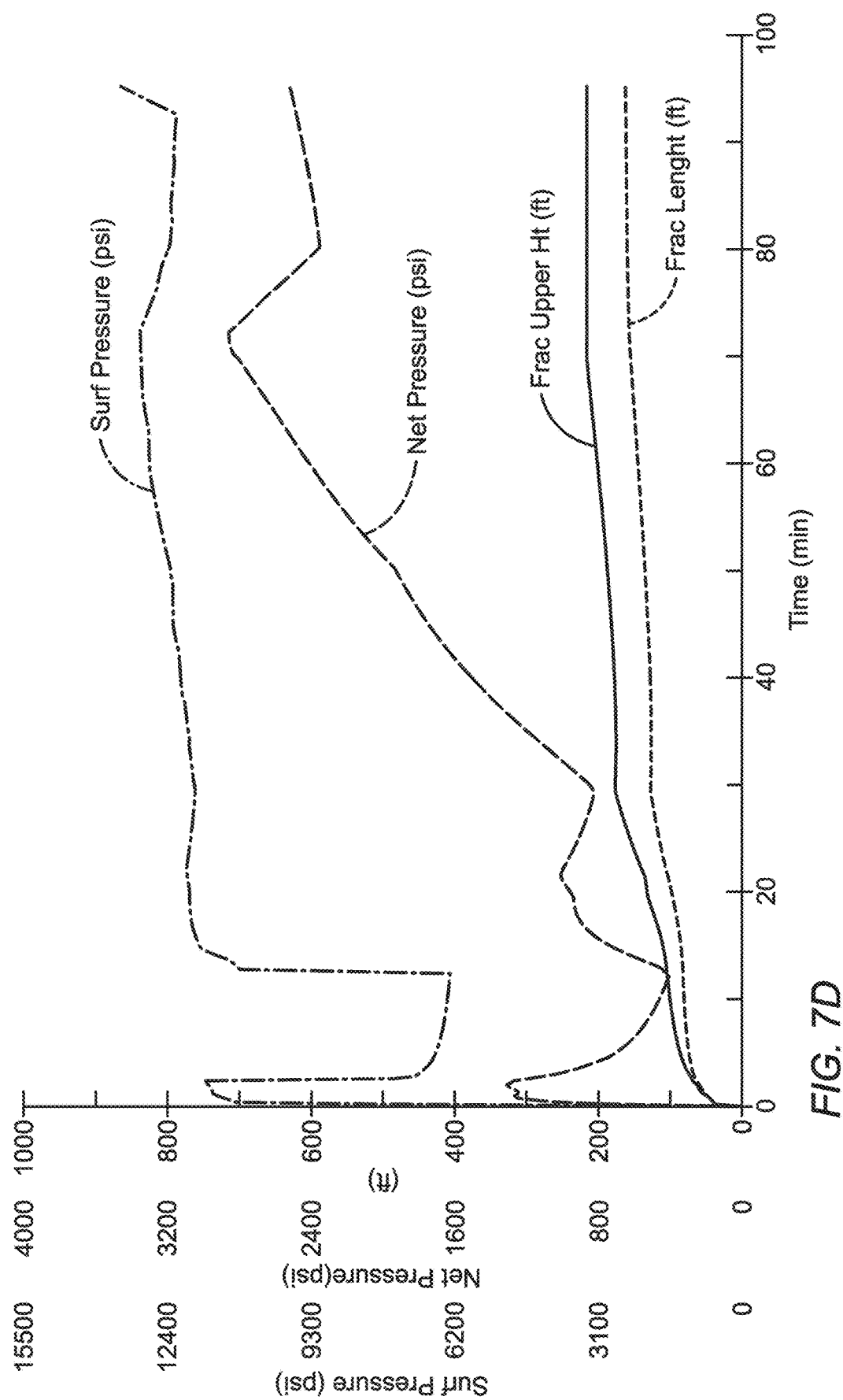
Figure 7D:
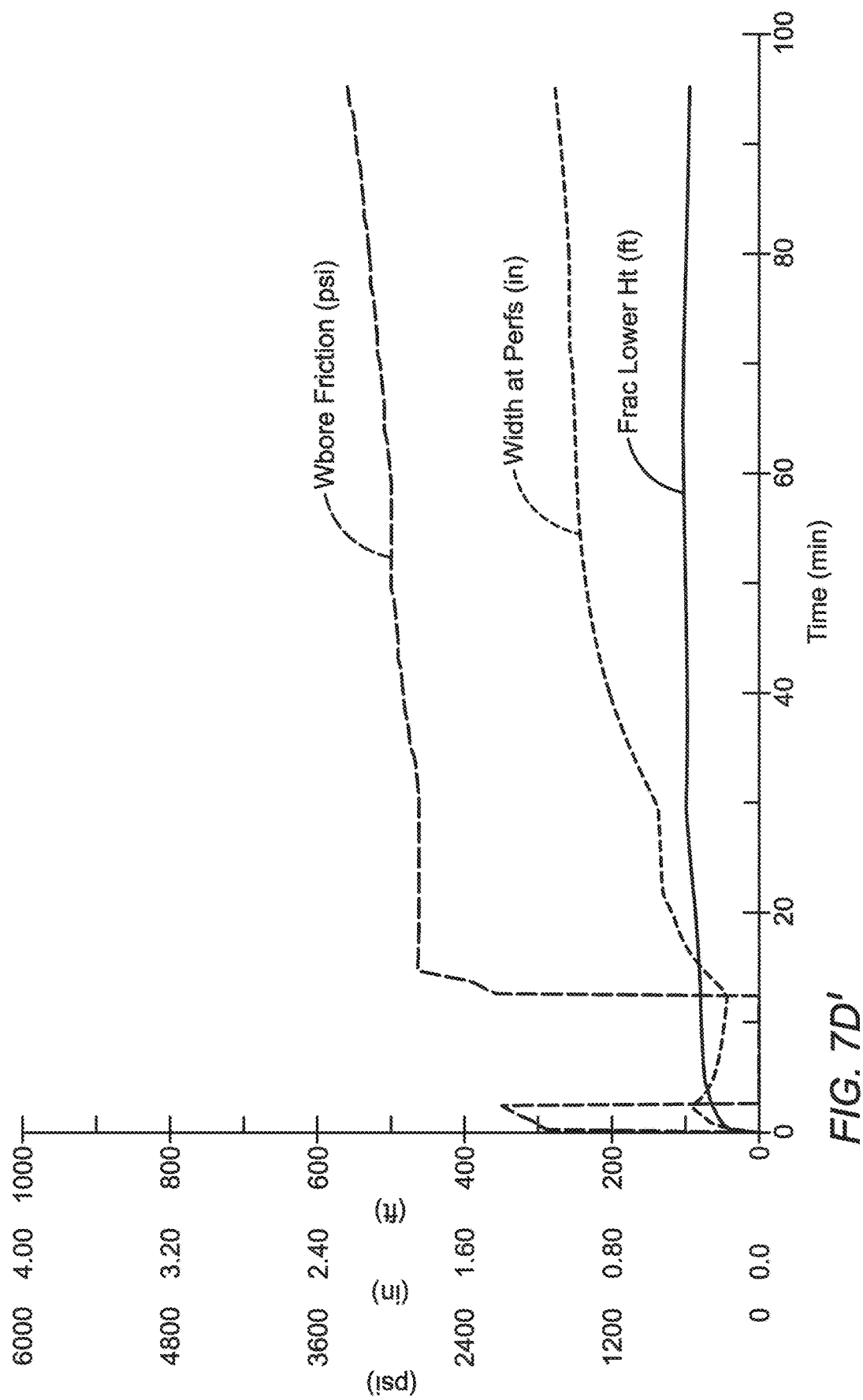

FIGS. 7D and 7D' are the graphical output of a computer simulation of surface treating pressure calculations and related fracture dimensions for a delayed borate crosslinked fracturing fluid system at a level of 40 lbs. per 1000 gallons of water.

DETAILED DESCRIPTION OF THE INVENTION

Figure 1:
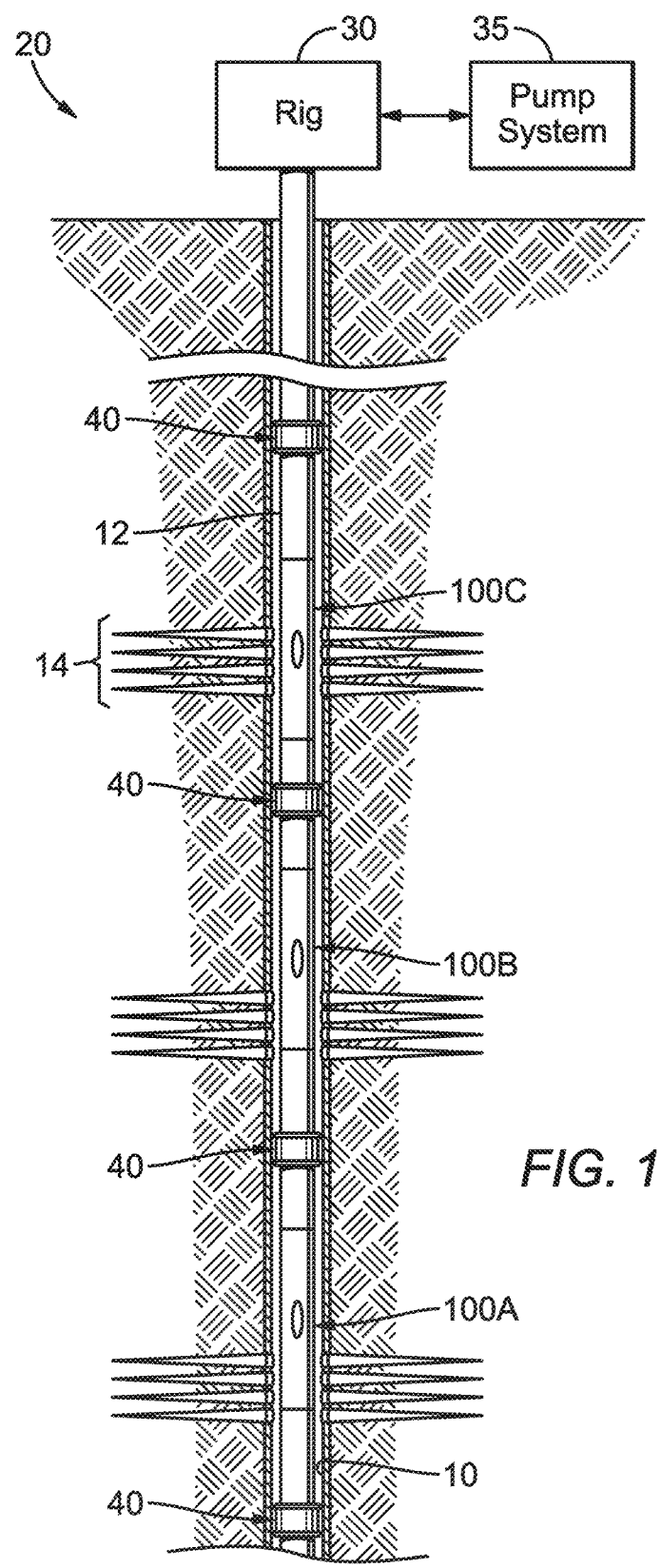
FIG. 1 is a schematic, cross-sectional view of a well undergoing a typical fracturing operation.

FIG. 1 illustrates a treatment system 20 according to one embodiment of the present invention for treating a formation intersected by a wellbore 10. A tubing string 12 deploys from a rig 30 into the wellbore 10. The string 12 has fracture sleeves 100A-C disposed along its length. Various packers 40 may isolate portions of the wellbore 10 into isolated zones. In general, the wellbore 10 can be an opened or cased hole, and the packers 40 may be any suitable type of packer intended to isolate portions of the wellbore into isolated zones.

The fracture sleeves 100A-C on the tubing string 12 between the packers 40 are initially closed during run in, but may be opened to divert treatment fluid to the isolated zones of the surrounding formation, as discussed below. The tubing string 12 may be part of a fracture assembly, for example, having a top liner packer (not shown), a wellbore isolation valve (not shown), and other packers and sleeves (not shown) in addition to those shown. If the wellbore 10 has casing, then wellbore 10 may have casing perforations 14 at various points.

As conventionally done, operators deploy a setting ball to close the wellbore isolation valve (not shown). Then, operators rig up the fracturing surface equipment at the rig 30 and pumping system 35 and pump fluid down the wellbore 10 to open a pressure-actuated sleeve (not shown) toward the end of the tubing string 12. This treats a first zone of the formation.

Then, in later stages of the operation, operators selectively actuate the fracture sleeves 100A-C between the packers 40 to treat the isolated zones depicted in FIG. 1. A number of mechanisms and techniques may be used to open the fracture sleeves 100A-C. In a typical arrangement, successively dropped plugs or balls engage a respective seat in each of the fracture sleeves 100A-C and create a barrier to the zones below. Applied differential tubing pressure may then be used to shift the respective sleeve 100A-C open so that the treatment fluid may stimulate the adjacent zone. Some ball-actuated fracture sleeves may be mechanically shifted back into the closed position. This affords the operator the ability to isolate problematic sections where water influx or other unwanted egress from the formation or a previously fractured zone may take place.

In treating the zones of the wellbore 10, fracture equipment of the rig 30 and pump system 35 at surface pump the treatment fluid (e.g., carrier fluid, fracture proppant, etc.) down the tubing string 12. In general, the rig 30 may have a fluid system, a launcher, and a pressure control assembly (i.e., blowout preventer, wellhead, shutoff valve, etc.). The launcher may be used to launch the plugs, such as darts, fracture balls, or other actuating devices, for opening downhole fracture sleeves 100A-C disposed on the tubing string 12. For its part, the pump system 35 includes one or more flow lines, pumps, control valves, a fluid reservoir (e.g., pit or tank), a solids separator, various sensors, stroke counters, and a proppant mixer.

The industry is in need of a low-viscosity fracturing fluid option. Increasingly, operators request a high-viscosity friction reducer that offers better carrying capacity than traditional friction reducers. Although production may be gained by this approach, the models predict a major loss of proppant placement when using conventional fluids.

As discussed in detail above, hydraulic fracturing is widely utilized to improve hydrocarbon productivity from permeability challenged reservoirs. During a typical hydraulic fracturing treatment, a fracturing fluid is injected into a wellbore and penetrated into a rock formation at a pressure above the formation pressure so as to create tensile open area. Following the first initiation phase, proppant is added to the fracturing fluid and injected into the newly created open area to prevent it from closing during production and also to provide conductive flow paths for hydrocarbon extraction from the target area. The overall success of the fracturing treatment and induced fracture characteristics (such as length, height, extent, and conductivity) are dependent on the rheological properties of the fracturing fluid which also influences proppant transport, distribution and mechanical behavior within the developed hydraulic fracture and/or reactivated natural fractures.

Currently, high concentrations and/or high-strength proppants are typically used in the industry to minimize proppant embedment and crush and hence the fracture closure risk. However, in order to utilize high proppant concentrations and/or high-strength proppants, the rheological properties of the fracturing fluid must be carefully chosen in order to get the proppant to where it is most needed in the reservoir so as to maximize long-term production. When a low-viscosity fluid (such as slick water) is selected, the hydraulic fracture could be initiated, propagated and well-contained within the pay zone, however, high concentration and/or high-strength proppant tends to settle and accumulate on the bottom of the developed fractures which may greatly diminish the treatment efficiency. Thus, to carry a high concentration and/or high-strength proppant and provide relatively uniform distribution throughout the complex fracture network, one must use a high-viscosity fluid. Using a high-viscosity fluid may mitigate the proppant settling issue; however, it may also lead to: higher required pumping horsepower; lower propped fracture length with abnormally greater fracture height; lower conductive reservoir volume with less natural fracture reactivation; and, greater formation damage and residual guar polymer during flow back. Using a high-viscosity fluid, hydraulic fracture can readily extend out of the target zone and result in un-constrained fracture height growth. A massive portion of fracturing fluid and proppant could be sent into non-target zones and greatly decrease the treatment efficiency.

In order to overcome these obvious shortcomings, the present invention provides a fluid design with optimal rheological properties that replicates slick water flowback while providing the high proppant-carrying capacity that is commonly observed in high-concentration crosslinked systems; i.e., highly viscous fluids. By utilizing such a fluid, proppant delivery into the natural fracture networks may be achieved without unacceptably high pumping horsepower which is often encountered when running conventional highly viscous fluids. In summary, in order to maximize the stimulation efficiency of a reservoir, there is a need for a fluid and a methodology that provides the ability to transport high concentration and/or high-strength proppant without having to rely on the traditional approach which uses viscosity alone as a guide for selection.

Furthermore, the fluid design and proppant selection strategy should be customized and evaluated based on the local geological and formation characteristics. If engineered accurately, a fit-for-purpose fluid may well distribute the selected proppant into the fracture surface, which may sustain closure stresses by reducing embedment and/or crush risk, and result in longer effective fracture length(s) and larger conductive reservoir volume with enhanced conductivity and hence production. Thus, there is a need for an integrated geo-mechanics-fluid workflow that is capable of providing an optimized design and/or evaluating and improving existing designs based on the reservoir properties and instrument limitations by iteratively optimizing relevant aspects/controls (such as fluid design, proppant type, pumping schedule) of a fracturing operation.

In the past, high-viscosity fluid (greater than 800 centipoise) has been the preferred solution for increased proppant transport and reduced proppant settling. This methodology has been effective using systems such as a borate-crosslinked fluid with a polymer loading of 40 lbs. per 1000 gallons of water and offers what the industry considers a standard for low-rate pumping with high proppant transporting, 40 BPM and >5 ppg, respectively. The downside of high polymer loads of guar is that they commonly increase formation damage created in the fracturing process, typically resulting in an 86% percent regain permeability value. While this may be acceptable, additional loss of needed fracture length is commonly observed when high-viscosity fluids are utilized to carry proppant. However, greater fracture geometry width is often considered a common characteristic of high viscosity fluids. Often, with low-viscosity fluids such as linear gels and friction reducers, fracture length may be established allowing breaks into the secondary fracture and mechanical reactivation of the pre-existing natural fracture network may be enhanced due to the interaction between natural fractures and propagating hydraulic fractures. Each individual natural fracture within the fracture network can reactivate in opening, slip or a combined mode with greatly increased fracture conductivity, which allows the fracturing fluid together with proppant to be diverted from the propagating hydraulic fractures into the fracture network. However, these fluids do not offer suspending characteristics past 30 minutes under static conditions. When applied to fracture geometry, this loss of suspending ability causes proppant to fall from suspension resulting in loss of uniform proppant placement and induce early closure at the location with less proppant coverage. As for the complex fracture geometry, the loss of suspending ability may also cause blockage at the intersection between the reactivated natural fractures and hydraulic fractures, introduce additional pressure loss, and consequently reduce the proppant transport efficiency and form potential chock points with the fracture network. In instances where frac gradients are high, high-viscosity fluids are often used to allow for lower treating rates. This approach is often taken with high viscosity fluids, but added treatment pressure may be required on surface, resulting in additional pumping horsepower requirements.

A secondary approach (and a more recent industry option) is the use of a high-viscosity friction reducer. As compared to guar-based systems, the viscosity of such fluids is far lower. However, proppant transport in such systems is not comparable to either alternative fluid systems or borate-crosslinked systems. When attempting to replicate the suspending properties of alternative fluid systems or borate cross-linked systems with a friction reducer, the friction reducer must be employed at a concentration that is not economically feasible and fluid compatibility (in terms of polymer actually working) suffers.

There is no existing, integrated, geo-mechanics-fluid workflow that can guide and optimize the fluid design for proppant transport during fracturing operations as described below.

The trend in the industry has been to obtain a high suspending characteristic fluid [as defined above] by increasing the fluid viscosity to more than 500 cP. Although this may be effective, fracture geometry may be adversely affected to a great extent. In contrast, the characteristics of a fluid according to the present invention are that of a low-viscosity system (similar to those of a linear fluid) but with suspending behavior better than even twice the weight of active polymer. Significantly, the fluid of the present invention exhibits suspending behavior greater than that of a 1000-cP system yet has an actual viscosity less than 100 cP. Reservoir concept models indicate that the fluid of the present invention may actually suspend and carry the proppant within the main hydraulic fractures as well as place proppant into reactivated natural fractures. An additional advantage of the new fluid system that is particularly needed is that the low-viscosity behavior may actually minimize the pumping horsepower requirement and improve the proppant coverage when carrying large/heavy proppant, keeping the proppant in the desired place, enhancing the conductivity of the stimulated fracture and reactivating natural fractures. With a low-viscosity fluid, the pumping horsepower required on location during a fracturing operation is lower. The high-viscosity fluids of the prior art require additional pumping horsepower on location to combat the added frictional pressure loss of high viscosity fluids such as crosslinked fluids where a viscosity no less than 200 cP may be reached on surface. This, along with other cross-linked fluids, may cause treatment rates to be reduced to compensate for the higher treatment pressure (especially when frac gradients are high). Low-viscosity fluids such as the new fluid of the present invention provide low viscosity yet more effective proppant transporting thereby keeping the proppant more effectively suspended and reducing perf bridging and proppant settling better than crosslinked fluids.

Low-viscosity fluids such as high-concentration friction reducers and linear gelling agents like guar are common, but do not allow proppant to be placed as effectively in fractures as the fluid of the present invention does. In terms of injection pressure, the fluid of the present invention is consistent with a conventional low-viscosity fluid such as a friction reducer. However, it has more than double the proppant-suspending power, which mitigates proppant settling within the fracture geometry, especially within a complex fracture network.

FIG. 3A illustrates the apparent viscosity of a fluid according to the invention in reference to the API 39 statement and provides a viscosity comparison of borate/guar fluid and a fluid according to the invention. It shows the viscosity versus time of DynaFrac which is a 40-lb. borate/guar system at 163° F. and that of a fluid according to the invention is shown at both room temp and at 163° F. FIG. 3A when referenced to FIGS. 3B and 3B' illustrates that, merely because a fluid yields high viscosity, proppant settling is not necessarily improved over a low-viscosity fluid.

In addition, it will be appreciated that, because of the low viscosity of a fluid according to the invention (as compared to a borate/guar system), less horsepower on surface is needed due to pumping fluid dynamics of viscosity principle.

FIG. 4 shows that the new fluid of the present invention is not affected in terms of viscosity at surface temperature when breaker is introduced. Often, in guar systems and true slickwater, breaking behavior begins to occur even at surface temperature. A system according to the present invention is preferably broken with ammonium persulfate breaker.

FIG. 5 illustrates making active co-polymer into a slurry form for easier field deployment and pumpability. Due to the surfactant and clay components used when making a slurry, the active co-polymer disperses more effectively into solution. This is illustrated where a 15-lb. slurry system yields a more effective viscosity than when a 20-lb dry form a/k/a co-polymer used alone. [don't see "15" in FIG. 5]

Referring now to FIGS. 6A through 6C", computer simulation results of fracturing operations using a conventional high viscosity fluid (a borate-crosslinked guar-based system), a conventional low-viscosity fluid (slickwater), and the new fluid of the present invention are shown, respectively. In FIGS. 6A through 6C", "NF" denotes natural fractures and "HF" denotes hydraulic fractures. Proppant dispersion is shown as a "heat map" wherein red areas have a high proppant concentration and blue areas have a low proppant concentration. Green and yellow areas have intermediate proppant concentrations. The ideal solution is a low-viscosity fluid which has high proppant carrying capacity while requiring relatively low power for injection.

The simulation results presented in FIGS. 6A through 6C" are based on the use of a 3-D reservoir scale fracturing simulator to model hydraulic fracture propagation, natural fracture reactivation and proppant transport within both hydraulic fracture and reactivated natural fracture networks.

State-of-the-art numerical simulations for fracturing are based on coupled Fracture Mechanics (FM) and Fluid Dynamics (FD). FM is a branch of solid mechanics that uses algorithms as well as numerical analysis to analyze (or solve) fracture propagation inquiries or problems. FM applies the theories of elasticity and plasticity to predict the rock failure behavior with respect to intrinsic mechanical properties and boundary conditions. FD is a sub discipline of fluid mechanics that may be used for simulating interactions involving fracturing fluid flow, fracture surfaces, proppant transport and boundary conditions. Fracturing fluid and proppant flow within a complex fracture network and the induced stress generated by fracture propagation and deformation are fully coupled in the 3-D reservoir scale fracturing simulator. Coupled FM and FD analysis may be used to understand and evaluate the influence of the proppant-carrying capacity of fluid and pumping strategy on the proppant transport efficiency in a complex fracture network. For example, coupled FM and FD may be used in some embodiments for optimizing the parameters affecting the proppant distribution within a developed fracture network such as, for example, injection rate, injection duration, proppant type and proppant concentration in the fluid.

Figure 2:
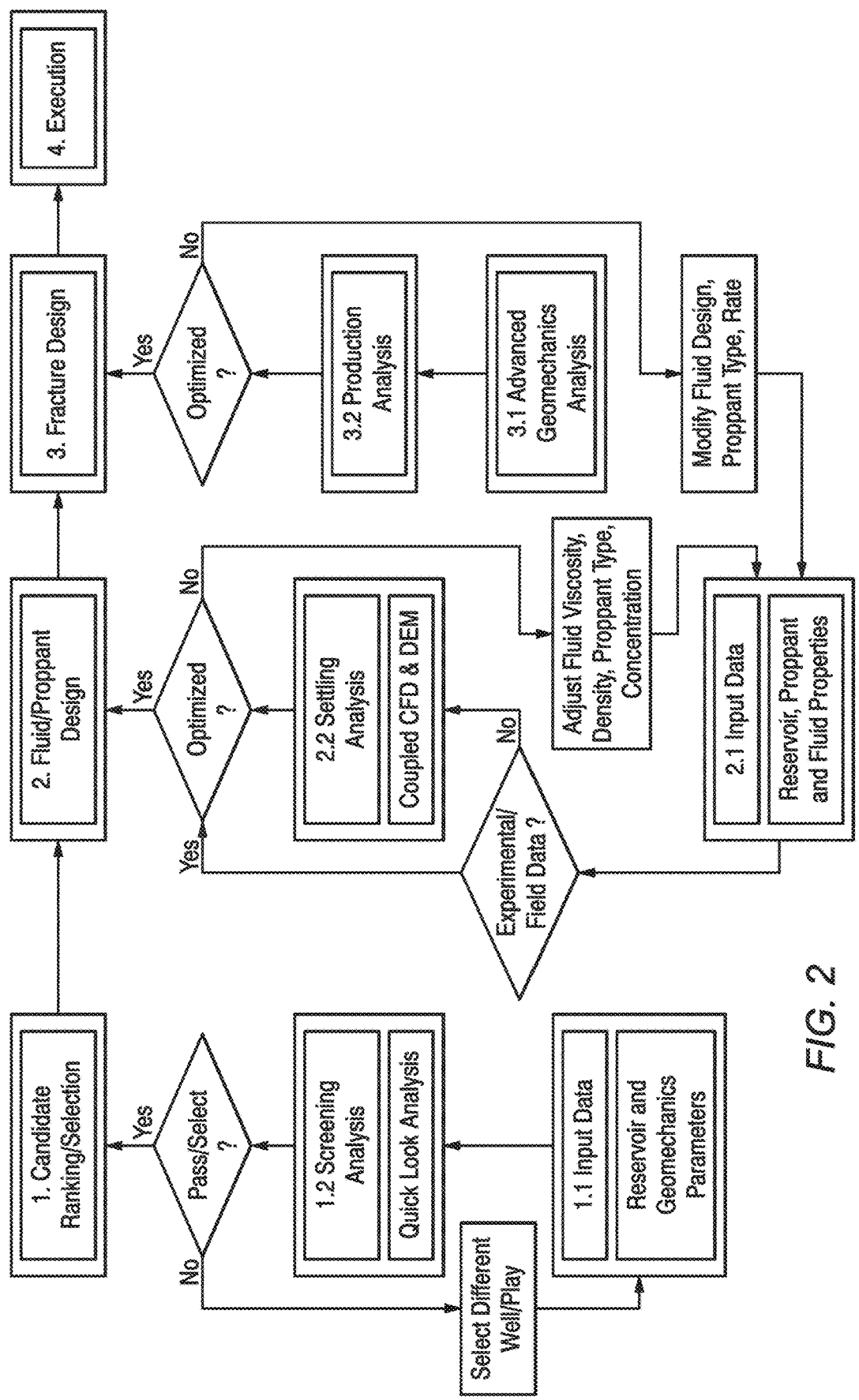
FIG. 2 is a flowchart depicting an integrated fluid-geomechanics workflow according to an embodiment of the invention.

To evaluate and quantify the efficiency of a proppant transport process using the new fluid of the present invention, an integrated geo-mechanics workflow comprised of multiple modules may be used, as shown in FIG. 2. In general, this workflow combines quick-look analysis (i.e. candidate selection) with advanced computational models (i.e. CFD-DEM [computational fluid dynamics-discrete element method] and geo-mechanical models) to provide operational guidelines to improve proppant deliverability and maximize production. Multiple analytical and numerical models and/or modules may be combined within the framework of the workflow to assess the design efficiency and customized fluid properties of the present invention.

Certain embodiments of the invention iteratively employ analytical and numerical functions and modeling, for example to run simulations and obtain the results thereof. In particular, as discussed in further detail below, specifically directed use of coupled Computational Fluid Dynamics (CFD), Discrete Element Methods (DEM), and analytical models may be used to create custom design and verify the experimental results on new fluid proppant carrying capacity characteristics.

Using logs and real-time log files obtained from an actual well in Argentina, simulations of pumping rate, frac geometry, and hydraulic horsepower (HHP) requirements were performed. In each case, the new fluid according to the present invention was shown to require less HHP than other representative fracturing fluids.

TABLE 1 presents simulation data using a pumping rate of 40 BPM as a baseline to provide an idea of HHP requirements at a low rate. It will be appreciated by those skilled in the art that a pumping rate of 40 BPM is not realistic for the proppant (at 5 PPG) used in actual slickwater (friction reducer) field applications. However, the new fluid is still shown to be more efficient in terms of lower hydraulic horsepower required and greater propped fracture coverage.

TABLE 1

| Fluid | PPG | Rate BPM | Avg. PSI | Frac Length (ft.) | prpL | Total fract height | Total prop. Ht. | Perf W | HHP |
|---|---|---|---|---|---|---|---|---|---|
| Guar | 1-5 | 40 | 11,170 | 118.7 | 92.7 | 253.8 | 198.3 | .304 | 10,950 |
| Slickwater | 1-5 | 40 | 9978 | 147.6 | 77.3 | 253.0 | 196.0 | .262 | 9782 |
| Borate/Guar | 1-5 | 40 | 10,850 | 121.0 | 92.5 | 245.9 | 188.0 | .336 | 10,637 |
| New fluid | 1-5 | 40 | 9550 | 121.7 | 114.4 | 253.1 | 186.4 | .312 | 9363 |

The simulations presented in TABLE 2 applied what would be the minimal pumping rate required to successfully pump a well without screening out and/or bridging off perforations. This is more so focused when linear gelled fluids and or slickwater fluids are applied (both were considered in determining pumping rate, with an error factor of 10%).

TABLE 2

| Fluid | PPG | Rate BPM | Avg. PSI | Frac Length (ft.) | prpL | Total Frac height | Total prop. Ht. | Perf W | HHP |
|---|---|---|---|---|---|---|---|---|---|
| Guar | 1-5 | 60 | 12,982 | 125.1 | 92.9 | 267.1 | 198.3 | .418 | 19,091 |
| Slickwater | 1-5 | 90 | 12,444 | 127.2 | 93.2 | 275.0 | 201.5 | .466 | 27,449 |
| Borate/Guar | 1-5 | 55 | 12,267 | 121.4 | 90.3 | 255.0 | 190.0 | .650 | 16,536 |
| New fluid | 1-5 | 45 | 10,529 | 123.0 | 118.5 | 258.4 | 198.0 | .314 | 11,613 |

The simulations presented in TABLE 3 utilized the actual pump schedule that would likely be used with the new fluid. Inasmuch as the job being modeled required a low rate and high proppant amounts to pump proppant away, slickwater was not considered. At 5 ppg, proppant is falling quicker than fluid at 60 BPM. Use of the new fluid according to the present invention is shown to reduce required HHP by the equivalent of two trucks having skid-mounted pumps and the equivalent of four trucks having body-loaded pumps.

TABLE 3

| Fluid | PPG | Rate BPM | Avg. PSI | Fracture Length (ft.) | prpL | Total frac height | Total prop. height | Perf width | HHP |
|---|---|---|---|---|---|---|---|---|---|
| Guar | 1-5 | 60 | 12,907 | 180.4 | 161.8 | 295.6 | 265.3 | 0.728 | 18,980 |
| MF 40 | 1-5 | 60 | 13,317 | 151.1 | 137.4 | 310.7 | 282.6 | 0.895 | 19,584 |
| DF 40 | 1-5 | 60 | 12,790 | 162.3 | 146.5 | 310.7 | 280.6 | 0.798 | 18,808 |
| New fluid | 1-5 | 60 | 10,853 | 184.2 | 161.6 | 294.0 | 257.9 | 0.720 | 15,960 |

In the above tables, the following abbreviations are used:

prpL=propped Frac Length (in feet)

ttl Frac Ht=Total Frac Height (in feet)

ttl prpHt=Total Propped Frac Height (in feet)

Perf W=Perforation width (in feet)

HHP=Hydraulic Horsepower

DF=DynaFrac® delayed borate crosslinked fluid and additives [WEATHERFORD TECHNOLOGY HOLDINGS, LLC 2000, ST. JAMES PL., HOUSTON, TEXAS 77056] (GuarHPG/borate crosslink)

MF=a CMHPG/zirconium crosslinked fluid

Guar=Standard linear fluid, e.g. AquaVis® water-soluble polymers [HERCULES LLC, 500 HERCULES ROAD, WILMINGTON, DELAWARE 19808]

FIGS. 7A through 7D" are graphical representations from simulations of surface pressure, net pressure, wellbore friction, fracture length, fracture upper height, fracture lower height, and the maximum width of fracture at wellbore versus time for various convention fracturing fluids and the new fluid of the present invention.

Current numerical simulations for particle settling analysis are based on coupled Computational Fluid Dynamics (CFD) and Discrete Element Methods (DEMs). CFD is a branch of fluid mechanics using algorithms as well as numerical analysis to analyze (or solve) fluid flow inquiries or problems. CFD is a computer-based mechanism for making calculations to simulate interactions involving liquids, gases, surfaces, and boundary conditions. DEM belongs to a well-known family of numerical methods used to compute particle motion and interaction. These models may be used to better design and calibrate against particle settling experiments. In many embodiments, coupled CFD and DEM analysis may be used to understand and evaluate the proppant carrying capacity of a certain fluid. For example, coupled CFD and DEMs may be used in some embodiments for optimizing the parameters affecting proppant settling properties such as, for example, proppant size, proppant density, and proppant concentration (in the fluid). However, it should be appreciated that the method may be generalized to any proppant and any fluid to optimize the parameters that affect proppant settling.

The workflow may start with a candidate ranking and selection module to ensure that correct wells and/or stages are ranked and chosen for hydraulic fracturing. This module may contain input data collection and quick-look analysis to compare and contrast fracture potential between multiple well(s) or well stage(s). The input data may be collected from multiple sources, including core samples, log data and field data. The collected data and/or attributes may include reservoir characteristics (e.g., depth, pore pressure gradient, porosity, permeability, TOC, water saturation) and the geomechanical properties of the play (e.g., Young's modulus, Poisson's ratio, rock strength, cohesion and shmin gradient (minimum horizontal in-situ stress)), which may be ranked and integrated to predict the fracture potential.

Once the most viable candidate wells and/or stages are chosen, experiments and/or numerical analysis may be conducted to quantify and assess the proppant-carrying capacity of the fracturing fluid of the present invention using the fluid and proppant design module. The available experimental and/or field test results may also be utilized to calibrate the numerical small-scale engine (e.g., CFD & DEM) for any future analysis, which may result in cost savings. With the aid of the numerical model, or by actual experiments and/or field tests, the fluid properties (viscosity, density, and proppant carrying capacity), proppant type and concentration may be modified and/or re-designed in order to achieve higher proppant carrying capacity, lower proppant settling, and appropriate stability of the fluid based on the specific reservoir and injection conditions. This process may be repeated until an optimized fluid and proppant design is obtained, which may be further analyzed in the fracture design module using an advanced geo-mechanical and production model.

The fracture design module may first simulate proppant transport using the fluid and proppant properties exported from the previous analysis and may quantify proppant coverage and distribution using an advanced geo-mechanical model. The geo-mechanical analysis may model hydraulic fracture propagation, fracture height growth, natural fracture reactivation, and proppant transport within both hydraulic fractures and reactivated natural fracture networks. The geo-mechanical model may also simulate proppant mechanical deformation (both embedment and crush) and the resulting fracture closure behavior during production to quantify conductivity reservoir volume for production analysis. The relevant mechanical properties and behavior of the chosen proppant type are preferably calibrated through related experimental work and implemented into the numerical models.

The workflow may include production prediction to evaluate any proposed or existing design for a specific formation. If the predicted production falls below the target value or an economically viable level, the analysis module may adjust the engineering design parameters and/or controls such as fluid property, proppant type, injection rate, pumping schedule, etc. (which, in an embodiment, includes an emphasis on the proppant-carrying properties of the fluid of the present invention) and iteratively rerun the fluid and proppant design module and the fracture design module until obtaining an improved and/or optimized design. Once an acceptably optimized engineering design is obtained, the analysis module may output design parameters for use in customizing the fluid properties of the present invention and to guide the field operations so as to maximize production.

A fluid according to the present invention allows proppant to be placed into fractures more efficiently than conventional fracturing with low-viscosity properties. This provides higher proppant carrying capacity within the fracture system (main hydraulic fracture and activated natural fractures). In addition, it minimizes the pumping horsepower requirement by minimizing the fluid viscosity. Moreover, lower fluid viscosity results in less wellbore damage and reduced residual polymer within the formation by increasing the regain permeability (e.g., increasing to 96.5 md from 85 md when compared equally at a 20-lb. concentration). The fluid system of the present invention does not depend upon inherent viscosity to suspend and transport proppant. A fluid that utilizes a three-dimensional proppant-suspending mechanism in a relatively low-viscosity environment may be made using polyacrylamide polymers that are functionalized via synthesis using a free-radical micellar polymerization method with low amounts of anionic long-chain alkyl, sodium 9- (and 10-) acrylamidostearate with AMPS, sodium dodecyl sulfate, vinyl pyrrolidone, hydroxyethyl acrylate and/or ionizable carboxylic groups depending upon the desired final fluid rheological properties and brine compatibilities. For some versions of the fluid, minor amounts of other mono-functional or poly-functional monomers including styrene, vinyl toluene, butyl acrylate, methyl methacrylate, vinylidene chloride, vinyl acetate and the like may also be added to the backbone of the main polymer once the water solubility of the polymer is assured.

In addition, the fluid system of the present invention may be optimized using an integrated geo-mechanical-fluid flow workflow. Multiple scales of both analytical and numerical models may be set up and utilized in the workflow to assess the proppant carrying capacity of the fluid of the present invention and ensure the success of utilizing the fluid of the present invention. The fluid of the present invention design methodology may be customized and flexible based on available experimental data, reservoir condition, proppant type and user-specific requirements to enhance the proppant carrying capacity while lowering the required pumping horsepower for injection. The fluid design may be coupled with reservoir-scale fracture simulations. By comparing and contrasting different design plans, the proppant settling, embedment and crush may be minimized so as to enhance the proppant coverage and conductive reservoir volume within the framework of the workflow. In such a way, the engineering parameters, including fluid properties, proppant type and pumping schedule, may be iteratively optimized to enhance the proppant-carrying efficiency of the fluid of the present invention and hence the overall production. The ultimate decision on the fluid design strategy for a successful hydraulic fracture treatment should be assessed within the local geological condition by using the integrated workflow for thorough evaluation. Thus, the engineering fluid design and pumping schedule may be customized based on data unique to different formations.

An exemplary viscosifying agent according to one embodiment of the invention is product that comprises a copolymer that has been polymerized using two separate monomers—the first being an acrylic acid monomer and the second comprising a monomer selected from;
    a) about 20% to about 80% by weight of at least one carboxylic acid monomer comprising acrylic acid, methacrylic acid, itaconic acid, fumaric acid, crotonic acid, aconitic acid, or maleic acid, or combinations thereof;

b) about 80% to about 15% by weight of at least one $C_1$ to $C_5$ alkyl ester and/or at least one $C_1$ to $C_5$ hydroxyalkyl ester of acrylic acid or methacrylic acid;
c) about 0.01% to about 5% by weight of at least one crosslinking monomer; and optionally
d) about 1% to about 35% by weight of at least one α,β-ethylenically unsaturated monomer selected from;

$CH_2=C(R)C(O)OR^1$ wherein R is selected from hydrogen or methyl; and $R^1$ is selected from $C_6$-$C_{10}$ alkyl, $C_6$ to $C_{10}$ hydroxyalkyl, $-(CH_2)_2OCH_2CH_3$, and $-(CH_2)_{2C}(O)OH$ and salts thereof.

$CH_2=C(R)X$ wherein R is hydrogen or methyl; and X is selected from $-C_6H_5$, $-CN$, $-C(O)NH_2$, $-NC_4H_6O$, $-C(O)NHC(CH_3)_3$, $-C(O)N(CH_3)_2$, $-C(O)NHC(CH_3MCH_2)_4CH_3$, and $-C(O)NHC(CH_3)_2CH_2S(O)(O)OH$ and salts thereof.

$CH_2=CHOC(O)R^1$ wherein $R^1$ is linear or branched $C_1$-$C_{18}$ alkyl; and $CH_2=C(R)C(O)OAOR^2$ wherein A is a divalent radical selected from $-CH_2CH(OH)CH_2-$, and $CH_2CH(CH_2OH)-$, R is selected from hydrogen or methyl, and $R^2$ is an acyl residue of a linear or branched, saturated or unsaturated $C_{10}$ to $C_{22}$ fatty acid.

The polymerization may be a random polymerization—i.e., although on a weight basis there is a certain, selected amount of each monomer, the order in which the monomers are arranged in the polymer backbone is not definite.

In the copolymer, the predominant monomer in the polymer is preferably acrylic acid, with relatively little of the secondary monomer in the polymer. The overall MW of the copolymer may be very high, approximately 1,000,000,000 Daltons, at least $1\times10^9$ Daltons, or greater than $1\times10^9$ Daltons.

Of course many variations may be substituted to obtain a similar effect by those skilled in the art.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:
1. A hydraulic fracturing system, comprising:
a base carrier fluid;
a viscosifying agent added to the base carrier fluid, the viscosifying agent comprising a copolymer polymerized using two different monomers, wherein a molecular weight of the copolymer is about $1\times10^9$ Daltons, wherein a first of the two different monomers is an acrylic acid monomer, and wherein a second of the two different monomers is selected from the group consisting of: a) a carboxylic acid monomer, b) a $C_1$ to $C_5$ alkyl ester and/or a $C_1$ to $C_5$ hydroxyalkyl ester of acrylic acid or methacrylic acid, and c) a crosslinking monomer; and
a proppant suspended in the base carrier fluid having the viscosifying agent,
wherein the base fluid having the viscosifying agent comprises:
a viscosity of 20 cP to 150 cP at ambient temperature at 511 1/s with R1:B1 bob configuration and equivalent viscosity with R1:B5 and R1:B2 configurations;
a pumpability of as much as 60 bbl/minute; and
a proppant-carrying capacity to carry the proppant at a concentration ranging from 0.1 lb/gl to 20 lbs/gl and suspending behavior greater than that of a 1000-cP system.

2. A method to hydraulically fracture a formation, the method comprising:
suspending a proppant in a fracturing fluid comprising a base carrier fluid and a viscosifying agent, the viscosifying agent comprising a copolymer polymerized using two different monomers, wherein a molecular weight of the copolymer is about $1\times10^9$ Daltons, wherein a first of the two different monomers is an acrylic acid monomer, and wherein a second of the two different monomers is selected from the group consisting of: a) a carboxylic acid monomer, b) a $C_1$ to $C_5$ alkyl ester and/or a $C_1$ to $C_5$ hydroxyalkyl ester of acrylic acid or methacrylic acid, and c) a crosslinking monomer, wherein the fracturing fluid with the viscosifying agent comprises:
a viscosity of 20 cP to 150 cP at ambient temperature at 511 1/s with R1:B1 bob configuration and equivalent viscosity with R1:B5 and R1:B2 configurations;
a pumpability at least as great as 60 bbl/minute; and
a proppant-carrying capacity to carry the proppant at a concentration ranging from 0.1 lb/gl to 20 lbs/gl and suspending behavior greater than that of a 1000-cP system; and
injecting the fracturing fluid, comprising the viscosifying agent and the suspended proppant, into the formation in a fracturing operation.

3. The method of claim 2 wherein the carboxylic acid monomer is selected from the group consisting of acrylic acid, methacrylic acid, itaconic acid, fumaric acid, crotonic acid, aconitic acid, maleic acid, and combinations thereof.

4. The method of claim 2 wherein the carboxylic acid monomer comprises about 20% to about 80% by weight of the copolymer.

5. The method of claim 2 wherein the $C_1$ to $C_5$ alkyl ester and/or a $C_1$ to $C_5$ hydroxyalkyl ester of acrylic acid or methacrylic acid comprises about 80% to about 15% by weight of the copolymer.

6. The method of claim 2 wherein the $C_1$ to $C_5$ alkyl ester is a $C_1$ to $C_5$ hydroxyalkyl ester of acrylic acid.

7. The method of claim 2 wherein the $C_1$ to $C_5$ alkyl ester is a $C_1$ to $C_5$ hydroxyalkyl ester of methacrylic acid.

8. The method of claim 2 wherein the crosslinking monomer comprises about 0.01% to about 5% by weight of the copolymer.

9. The method of claim 2 wherein the copolymer is a random copolymer.

10. The method of claim 2 wherein acrylic acid monomer is a predominant monomer in the copolymer.

11. The method of claim 2, further comprising:
injecting a breaker into the formation; and
recovering at least a portion of the fracturing fluid by flow back.

12. The method of claim 11, wherein the breaker is selected from the group consisting of an oxidative breaker, an ammonium persulfate breaker, and a peroxide breaker.

13. The method of claim 2, wherein the method comprises selecting fracturing parameters for the fracturing operation; and wherein injecting the fracturing fluid in the fracturing operation comprises delivering the fracturing fluid to the formation at the selected fracturing parameters.

14. The method of claim 13, wherein selecting the fracturing parameters comprises:
    selecting at least one characteristic of the fracturing fluid, a type of the proppant, a concentration of the proppant, and a pumping rate for the fracturing fluid; and
    performing numerical analysis to assess the proppant-carrying capacity of the fracturing fluid based on the selections.

15. The method of claim 14, wherein the at least one selected characteristic of the fracturing fluid comprises the viscosity and a density of the fracturing fluid.

16. The method of claim 13, wherein selecting the fracturing parameters comprises performing one or more simulations to one or more of:
    predict a hydraulic fracture propagation, a fracture height growth, and a natural fracture reactivation;
    model proppant transport within both main hydraulic fractures and a reactivated natural fracture network;
    assess proppant embedment, crush, and fracture surface closure behavior during production; and
    forecast production efficiency.

17. The method of claim 2 wherein the viscosifying agent further comprises at least one a,β-ethylenically unsaturated monomer.

18. The method of claim 17 wherein the at least one a,β-ethylenically unsaturated monomer is selected from the group consisting of:
    (i) $CH_2=C(R)C(O)OR^1$ where R is selected from hydrogen or methyl, and where $R^1$ is selected from $C_6$-$C_{10}$ alkyl, $C_6$ to $C_{10}$ hydroxyalkyl, —$(CH_2)_2OCH_2CH_3$, —$(CH_2)_2C(O)OH$, and salts thereof;
    (ii) $CH_2=C(R)X$ where R is hydrogen or methyl, and where X is selected from —$C_6H_5$, —CN, —$C(O)NH_2$, —$NC_4H_6O$, —$C(O)NHC(CH_3)_3$, —$C(O)N(CH_3)_2$, —$C(O)NHC(CH_3MCH_2)_4CH_3$, —$C(O)NHC(CH_3)_2CH_2S(O)(O)OH$, and salts thereof;
    (iii) $CH_2=CHOC(O)R^1$ where $R^1$ is a linear or branched $C_1$-$C_{18}$ alkyl; and
    (iv) $CH_2=C(R)C(O)OAOR^2$ where A is a divalent radical selected from —$CH_2CH(OH)CH_2$— and —$CH_2CH(CH_2OH)$—, where R is selected from hydrogen or methyl, and where $R^2$ is an acyl residue of a linear or branched, saturated or unsaturated $C_{10}$ to $C_{22}$ fatty acid.

19. The method of claim 17 wherein the at least one a,β-ethylenically unsaturated monomer comprises about 1% to about 35% by weight of the copolymer.

* * * * *